United States Patent
Chen et al.

(10) Patent No.: US 10,620,404 B2
(45) Date of Patent: Apr. 14, 2020

(54) OPTICAL LENS

(71) Applicants: SINTAI OPTICAL (SHENZHEN) CO., LTD., Shenzhen, Guangdong Province (CN); ASIA OPTICAL CO., INC., Taichung (TW)

(72) Inventors: Chien-hung Chen, Taichung (TW); Hsi-ling Chang, Taichung (TW); Chun-hung Huang, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 500 days.

(21) Appl. No.: 15/395,281

(22) Filed: Dec. 30, 2016

(65) Prior Publication Data
US 2017/0192207 A1  Jul. 6, 2017

(30) Foreign Application Priority Data
Dec. 30, 2015 (CN) ............ 2015 1 1020384

(51) Int. Cl.
*G02B 13/00* (2006.01)
*G02B 5/00* (2006.01)
*G02B 9/60* (2006.01)

(52) U.S. Cl.
CPC ......... *G02B 13/0045* (2013.01); *G02B 5/005* (2013.01); *G02B 9/60* (2013.01)

(58) Field of Classification Search
CPC ...... G02B 13/0045; G02B 9/60; G02B 13/18; G02B 3/04; G02B 27/0025; G02B 13/0015; G02B 13/04; G02B 15/14; G02B 13/00; G02B 5/005; G02B 15/173; G02B 13/001; G02B 13/06; G02B 15/177; G02B 7/021; G02B 7/08; G02B 13/02; G02B 13/22; G02B 27/646; G02B 9/64
See application file for complete search history.

(56) References Cited

U.S. PATENT DOCUMENTS

| | | | |
|---|---|---|---|
| 9,927,595 B2 | 3/2018 | Shih et al. | |
| 2004/0027478 A1* | 2/2004 | Do | G02B 9/10 348/363 |
| 2004/0126106 A1* | 7/2004 | Horiike | G03B 9/08 396/463 |

(Continued)

FOREIGN PATENT DOCUMENTS

| | | |
|---|---|---|
| CN | 1497289 A | 5/2004 |
| CN | 202217101 U | 5/2012 |

(Continued)

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

An optical lens makes object light rays transmit from an object side to an image side on an optical axis and form an image on an image plane. The optical lens comprises a lens group establishing the optical axis, comprising a first lens and a second lens arranged in order from the image side to the object side, wherein the first lens has an image-side surface which is a concave face and has a point of inflection arranged thereon; and a first aperture stop and a second aperture stop separately located on the optical axis. The optical lens meets the thinning tendency.

17 Claims, 27 Drawing Sheets

(56) References Cited

U.S. PATENT DOCUMENTS

| | | |
|---|---|---|
| 2007/0030469 A1 | 2/2007 | Jasper |
| 2010/0220993 A1* | 9/2010 | Sawanobori ............ G03B 9/02 396/510 |
| 2011/0164313 A1 | 7/2011 | Stroessner |
| 2011/0164327 A1 | 7/2011 | Sato |
| 2012/0314302 A1 | 12/2012 | Tang et al. |
| 2013/0016435 A1 | 1/2013 | Tsai et al. |
| 2013/0279023 A1 | 10/2013 | Chen |
| 2014/0092488 A1 | 4/2014 | Liang |
| 2014/0211328 A1* | 7/2014 | Hashimoto ........ G02B 13/0045 359/714 |

FOREIGN PATENT DOCUMENTS

| | | |
|---|---|---|
| CN | 102879886 A | 1/2013 |
| CN | 204556941 U | 8/2015 |
| JP | 2007043168 A | 2/2007 |
| JP | 2010096820 A | 4/2010 |
| JP | 2011141396 A | 7/2011 |
| JP | 2012113015 A | 6/2012 |
| JP | 2014186095 A | 10/2014 |
| JP | 2015129869 | 7/2015 |
| TW | 201344280 A | 11/2013 |
| TW | 201415068 A | 4/2014 |
| WO | 2010034433 A1 | 4/2010 |
| WO | 2013058111 A1 | 4/2013 |

\* cited by examiner

US 10,620,404 B2

OPTICAL LENS

TECHNICAL FIELD OF THE DISCLOSURE

The present invention relates to an optical lens, and more particularly, to an optical lens equipped with two aperture stops.

BACKGROUND OF THE DISCLOSURE

An optical lens generally has an aperture stop, or even is equipped with an aperture-adjustable stop, that is, the size of aperture of the optical lens can be automatically or manually adjusted. In a conventional optical lens, the aperture-adjustable stop is disposed within the lens system or between any two lenses. This type of optical lens has to provide enough space for accommodating the structural components or electric control components used to mount the aperture-adjustable stop, and therefore there exists a problem of this type of optical lens which is unable to be further thinned.

SUMMARY OF THE DISCLOSURE

The objective of the present invention is to provide an optical lens for solving the problem of a conventional optical lens which is unable to be further thinned.

To achieve above objective, the present invention provides an optical lens, which makes object light rays transmit from an object side to an image side on an optical axis and form an image on an image plane, said optical lens comprising a lens group establishing the optical axis, comprising a first lens and a second lens arranged in order from the image side to the object side, wherein the first lens has an image-side surface which is a concave face and has a point of inflection arranged thereon and a first aperture stop and a second aperture stop separately located on the optical axis.

In another aspect, the present invention provides an optical lens, which makes object light rays transmit from an object side to an image side on an optical axis and form an image on an image plane, said optical lens comprising a lens group establishing the optical axis, a first aperture stop disposed within the lens group and a second aperture stop disposed at the object side outside the lens group.

The optical lens of the present invention improves the effective aperture range. In comparison to the optical lens having an aperture stop with adjustable aperture disposed within the lens group in the conventional skills, the optical lens of the present invention can deploy the aperture stop with adjustable aperture at the outside of the lens group, and therefore the structural components or electric control components required to be used to mount the aperture-adjustable stop can be moved to the outside of the lens group, thereby carrying out further thinning of the optical lens.

DETAILED DESCRIPTION OF THE DISCLOSURE

To make the above-mentioned and other objectives, features, and effects of the present invention more easily understood, the present invention is described in further detail below with reference to the embodiments in accompanying with the appending drawings.

For simplicity and ease of understanding, the features and/or components described in the present invention are illustrated by relative size and/or orientation, and however, actual size and/or orientation may differ from the illustrated size and/or orientation. For clarity, the size or relative size of the illustrated features and/or components may be exaggeratedly enlarged or shrunk. Also, for simplicity and clarity, identical or similar components are indicated by the same reference number and descriptions of well-known functions and structures are omitted.

The optical lens provided in the present invention is applicable to various image capturing devices equipped with a camera, for example, a cell phone, a smart phone, a tablet computer, a netbook, a laptop computer, a personal digital assistant (PDA), a handheld or portable computer, a smart watch, a smart glasses, a smart wearable device, a game player, a camera, a camcorder, a surveillance apparatus, an IP CAM, an event data recorder (EDR), a car rear view apparatus, and various sensors.

Figure 1A:
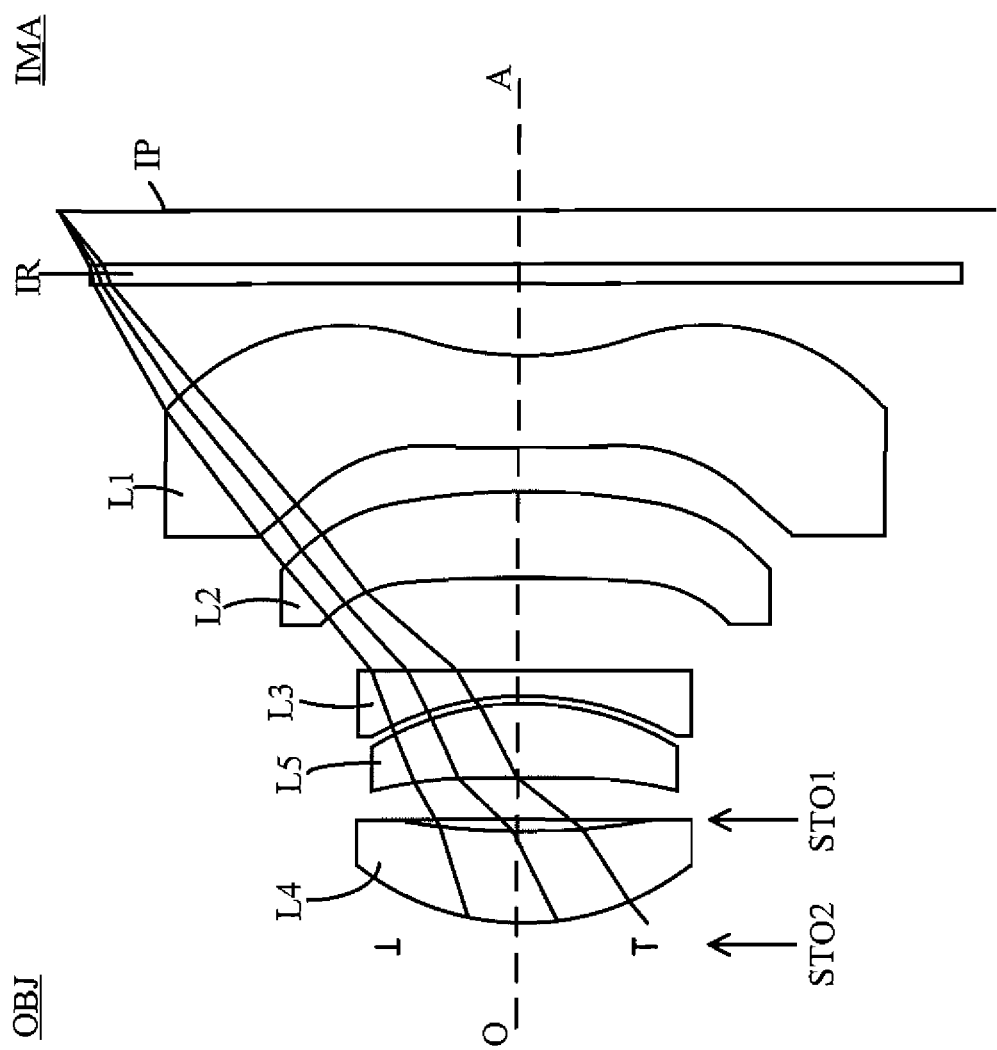
FIG. 1A is a schematic diagram showing an optical structure in accordance with a first embodiment of an optical lens of the present invention.
Figure 2A:
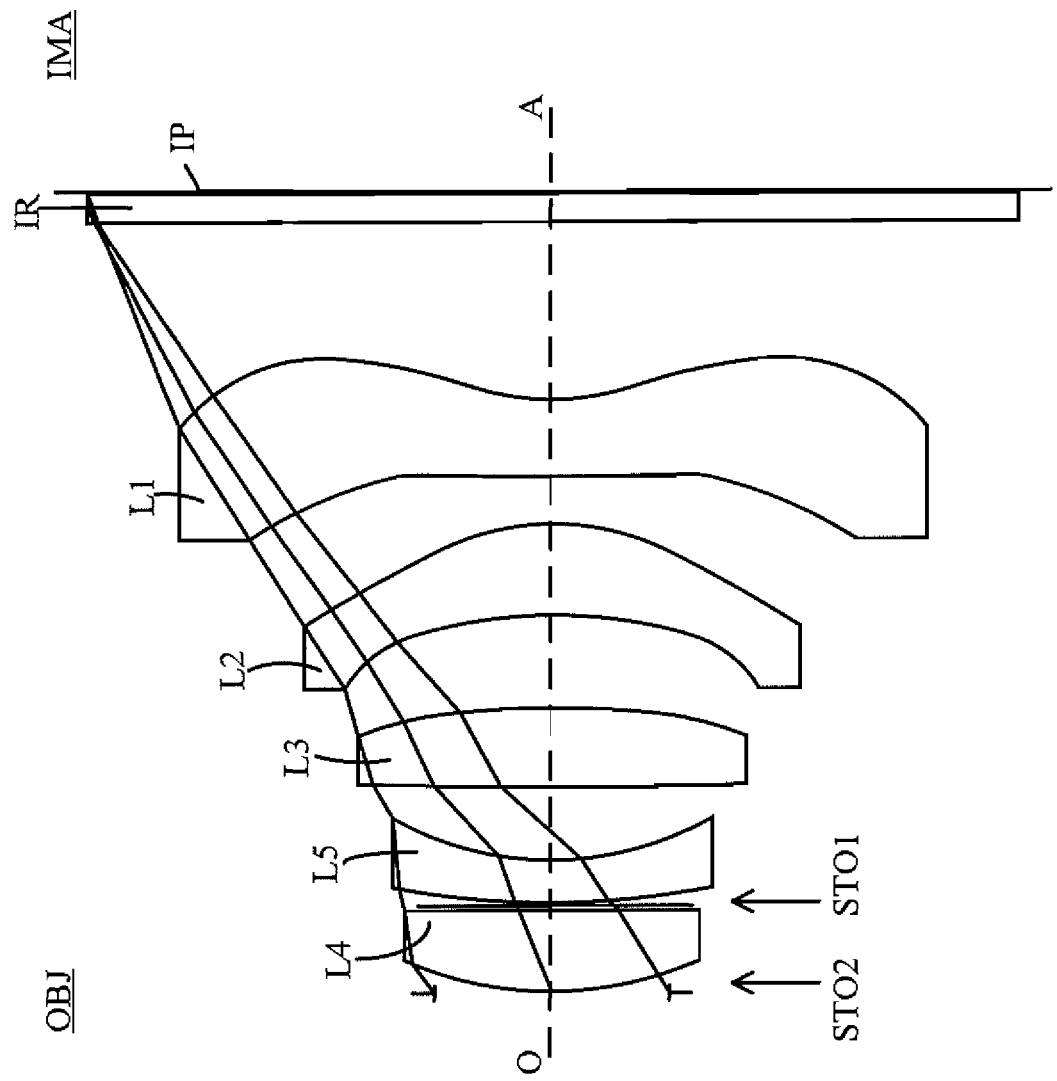
FIG. 2A is a schematic diagram showing an optical structure in accordance with a second embodiment of an optical lens of the present invention.
Figure 3A:
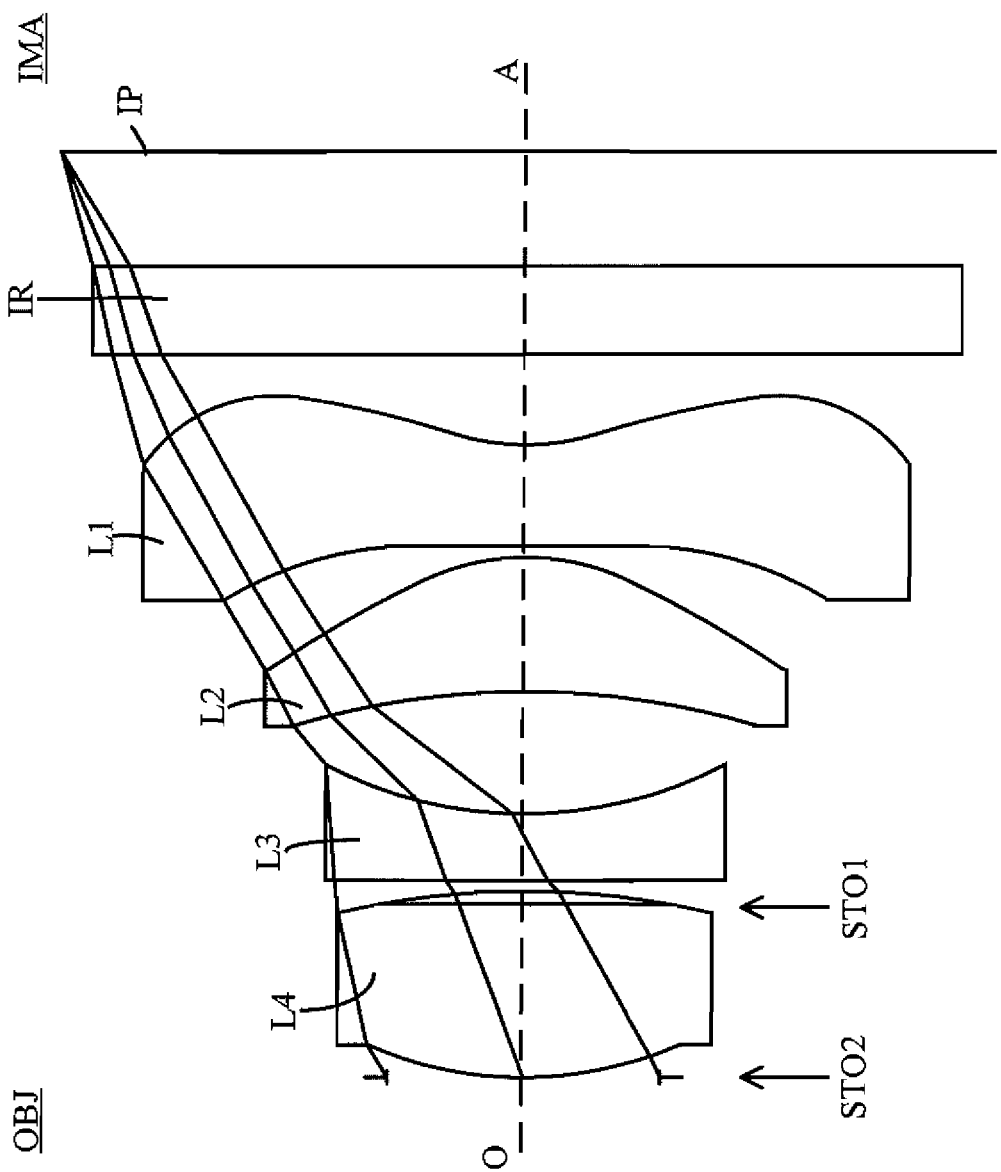
FIG. 3A is a schematic diagram showing an optical structure in accordance with a third embodiment of an optical lens of the present invention.
Figure 4A:
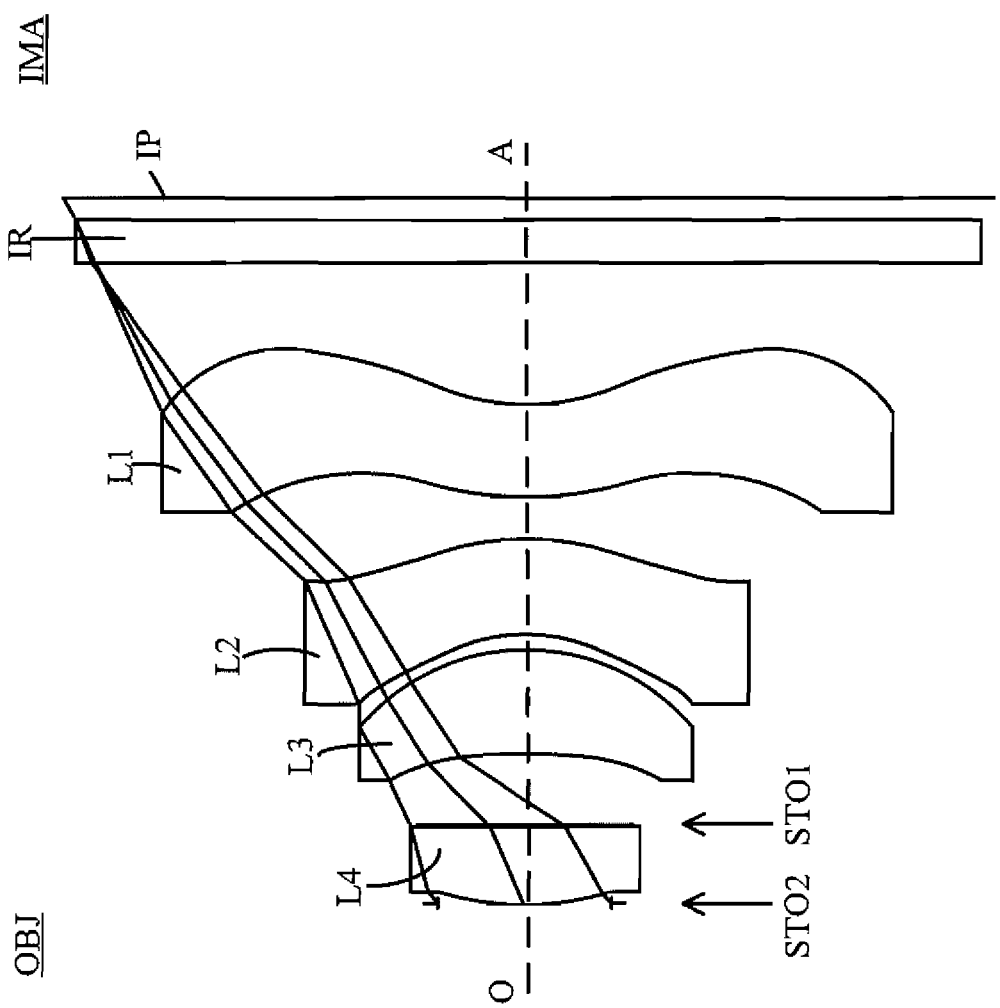
FIG. 4A is a schematic diagram showing an optical structure in accordance with a fourth embodiment of an optical lens of the present invention.
Figure 5A:
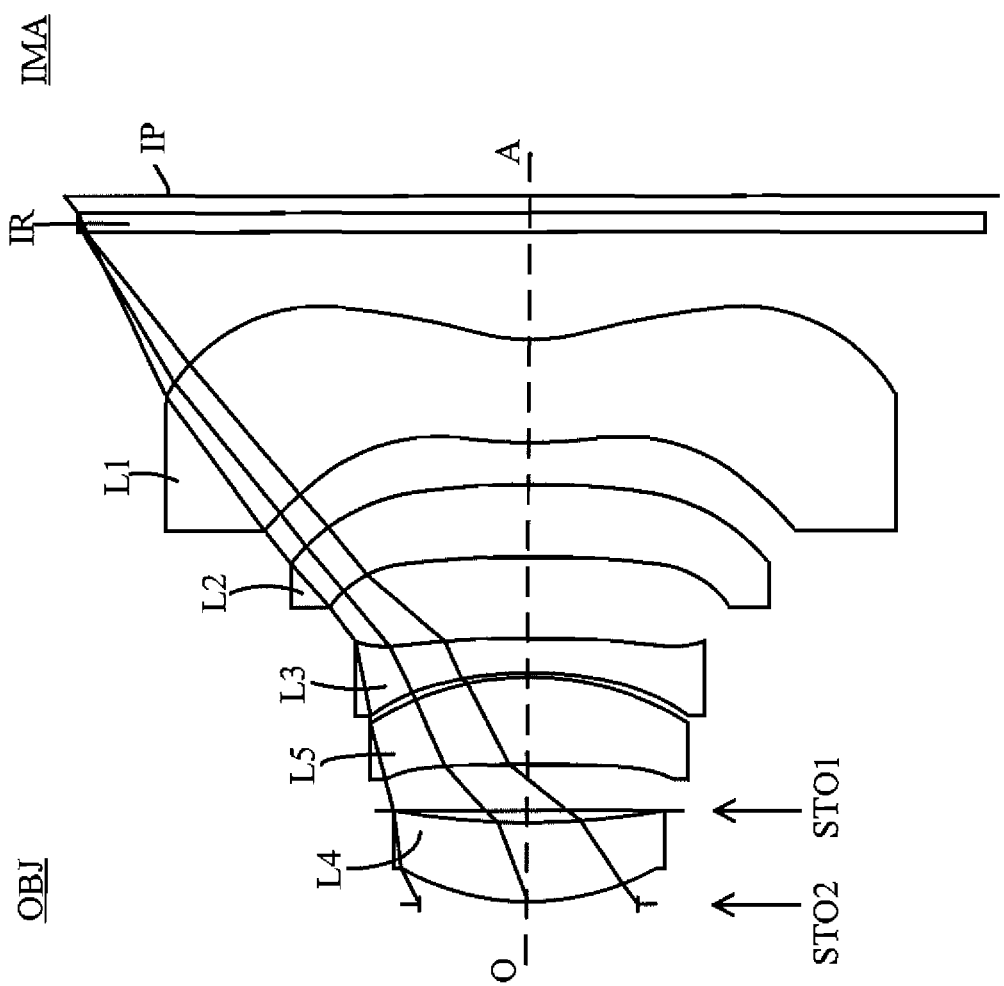
FIG. 5A is a schematic diagram showing an optical structure in accordance with a fifth embodiment of an optical lens of the present invention.

The basic structure of the optical lens of the present invention is illustrated by FIG. 1A (corresponding to a first embodiment), FIG. 2A (corresponding to a second embodiment), FIG. 3A (corresponding to a third embodiment), FIG. 4A (corresponding to a fourth embodiment), and FIG. 5A (corresponding to a fifth embodiment). The optical lens comprises a lens group, which establishes an optical axis OA and is arranged along the optical axis OA. Object light rays enter such an optical system from an object side OBJ of the optical axis OA and form an image on an image plane IP at an image side IMA thereof. The optical lens further comprises a first aperture stop STO1 and a second aperture stop STO2. Preferably, the first aperture stop STO1 is disposed inside the lens group, that is, between any two lenses of the lens group; and the second aperture stop STO2 is disposed outside the lens group at the outside of the object side OBJ of the optical axis OA, that is, at the outside of a lens of the lens group at the most object side OBJ.

In the illustrated optical lens, the aperture of the optical lens is defined by the aperture of the second aperture stop STO2 when a smaller aperture is required; the aperture of the optical lens is defined by the aperture of the first aperture stop STO1 when a larger aperture is required. For instance, when a smaller aperture is required, decrease the aperture of the second aperture stop STO2 to be at least less than the aperture of the first aperture stop STO1. Since the aperture of the first aperture stop STO1 is greater than that of the second aperture stop STO2, the first aperture stop STO1 ceases to be effective due to the evolution of light path and is thus in an inactive state. Meanwhile, the second aperture stop STO2 is in an active state, and therefore the smaller aperture of the optical lens is now defined by the aperture of the second aperture stop STO2. When a larger aperture is required, increase the aperture of the second aperture stop STO2 to be at least greater than the aperture of the first aperture stop STO1. Meanwhile, the second aperture stop STO2 ceases to be effective due to the evolution of light path and is thus in an inactive state. The first aperture stop STO1 is in an active state, and therefore the aperture of the optical lens is now defined by the first aperture stop STO1. The afore-described example is illustrated by taking the second aperture stop STO2 as an aperture stop with adjustable aperture for example. However, the following examples can also achieve above effects, that is, the first aperture stop STO1 is an aperture stop with adjustable aperture or both of the first aperture stop STO1 and the second aperture stop STO2 are adjustable in aperture. However, the second aperture stop STO2 that is adjustable in aperture has an advantage. That is, the aperture stop with adjustable aperture can be deployed at the outside of the lens at the most object side. Since there has more room for accommodating an aperture adjusting device in this configuration, the size of the optical lens can be reduced.

The afore-described optical framework improves the effective aperture range. In comparison to the optical lens having an aperture stop with adjustable aperture disposed within the lens group in the conventional skills, the optical lens of the present invention can deploy the aperture stop with adjustable aperture (that is, the second aperture stop STO2) at the outside of the lens group, and therefore the structural components or electric control components required to be used to mount the aperture-adjustable stop can be moved to the outside of the lens group, thereby carrying out further thinning of the optical lens.

The following is described with a package structure of the optical lens of the present invention.

Figure 6:
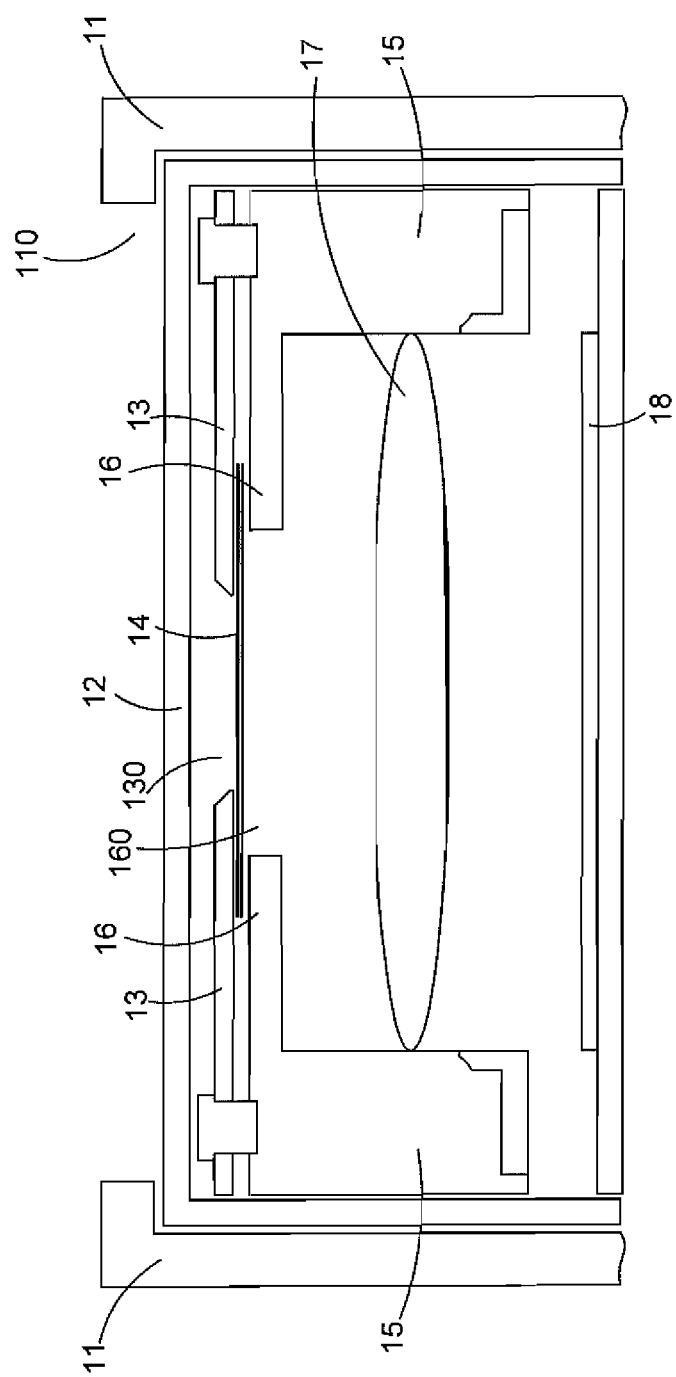
FIG. 6 is a schematic diagram showing a package structure in accordance with a first embodiment of an optical lens of the present invention.

Please refer to FIG. 6, which is a schematic diagram showing a package structure in accordance with a first embodiment of an optical lens of the present invention. The optical lens is packaged in an electronic device equipped with a photographing function and is disposed inside an external case 11 of the electronic device. The external case 11 has an opening 110 exposed therefrom, and light rays can thus enter the inner space of the optical lens through the opening 110. The optical lens has an optical system frame 15, a lens system 17, and an image recorder 18. The optical system frame 15 is made of plastic and is a fastening member of the optical system. The lens system 17 comprises one or more lenses mounted on the optical system frame 15. The image recorder 18 can receive the light rays transmitted from the lens system 17 and thus form an image on the image plane. The optical lens also has a transparent plate 12, a cover plate 13, a base plate 16, and one or more aperture adjusting blades 14. The base plate 16 is fastened on the optical system frame 15 or formed by extending from the optical system frame 15. The base plate 16 has an opening 160 disposed at a central part thereof. The cover plate 13 is spaced apart from the base plate 16 and is fastened to the base plate 16 or the optical system frame 15. The cover plate 13 is a flat metal plate and is perforated to form an opening 130 at a central part thereof. The opening 130 of the cover plate 13 corresponds to the opening 160 of the base plate 16. The aperture adjusting blade 14 is disposed in an accommodating space formed between the cover plate 13 and the base plate 16. This optical lens is an aperture-adjustable optical lens. The aperture adjusting blade 14 is driven by a driver (not shown) of an aperture adjusting device (not shown). The aperture of the optical lens is altered by adjusting the position of the aperture adjusting blade 14. The transparent plate 12 is disposed at the inner side of the external case 11 and is disposed next to the exposed opening 110 of the external case 11. Also, the transparent plate 12 is attached to the optical system frame 15. As can be seen from FIG. 6, the lens system 17, the base plate 16, the aperture adjusting blade 14, the cover plate 13, and the transparent plate 12 are sequentially arranged in order from the image side to the object side, that is, from the image recorder 18 to the exposed opening 110 of the external case 11.

As described above, the aperture adjusting blade 14 is disposed between the lens at the most object side and the exposed opening 110 of the external case 11. Therefore, in comparison to that disposed between any two lenses, this deployment leads to have more room at the lateral side for accommodating its driver and leads not to affect the deployment of other components. Further, the transparent plate 12 is fastened or attached to the optical system frame 15. Such a technical scheme can further prevent the dust from falling into the blade room accommodating the aperture adjusting blade 14.

Figure 7:
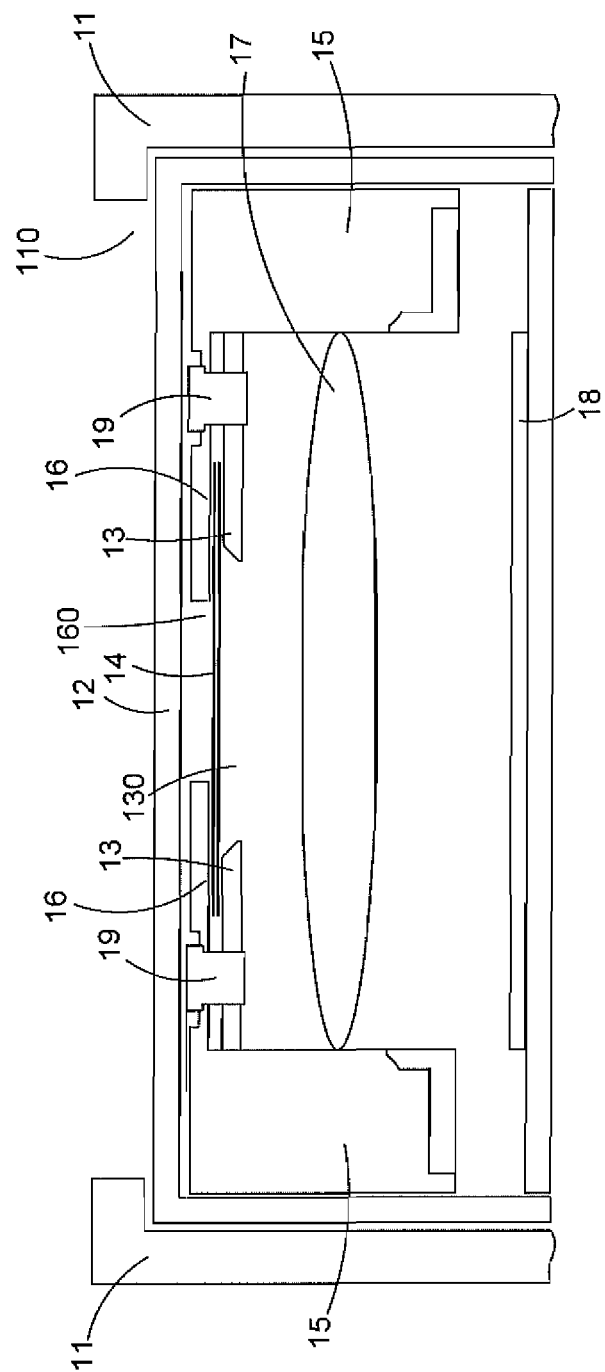
FIG. 7 is a schematic diagram showing a package structure in accordance with a second embodiment of an optical lens of the present invention.

Please refer to FIG. 7, which is a schematic diagram showing a package structure in accordance with a second embodiment of an optical lens of the present invention. In comparison to the package structure described in the first embodiment, the present embodiment locates the base plate 16 at the upper side and locates the cover plate 13 at the lower side. Screws 19 are utilized to fasten the cover plate 13 to the base plate 16 or the optical system frame 15. The cover plate 13 and the base plate 16 are spaced a part from each other. The aperture adjusting blade 14 is accommodated between the cover plate 13 and the base plate 16. As can be seen from FIG. 7, the lens system 17, the cover plate 13, the aperture adjusting blade 14, the base plate 16, and the transparent plate 12 are sequentially arranged in order from the image side to the object side, that is, from the image recorder 18 to the exposed opening 110 of the external case 11. In such a technical scheme, the cover plate 13 is moved to the lower side and thus the plastic material of the optical system frame 15 can be partially removed for deploying a space for disposing the screws 19, and therefore the fastening position of the screw can be moved down. In comparison to the embodiment shown in FIG. 6, this embodiment can reduce the thickness of the optical lens, and thus reduce the thickness of the device equipped with the optical lens.

The optical lens provided in the present invention will be further described with reference to the following five embodiments taking a mobile phone camera lens for example and the data adopted in the respective embodiments are listed for reference. The first embodiment is illustrated in FIGS. 1A to 1E; the second embodiment is illustrated in FIGS. 2A to 2E; the third embodiment is illustrated in FIGS. 3A to 3E; the fourth embodiment is illustrated in FIGS. 4A to 4E; and the fifth embodiment is illustrated in FIGS. 5A to 5E.

Some lenses in the optical lens of the present invention are aspheric lenses. The shape of an aspheric lens may be expressed by the following formula:

$$z(r) = \frac{C \cdot r^2}{1+\sqrt{1-(1+k) \cdot C^2 \cdot r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16} + \alpha_9 r^{18} + \alpha_{10} r^{20} \ldots$$

where z represents the sag of a point on the aspheric surface at a height h distanced to a central axis of the lens; C is a reciprocal of a paraxial curvature radius; r represents a height of a point on the aspheric surface with respect to the central axis; k is the conic constant of the aspheric lens; and $\alpha_1, \alpha_2, \ldots,$ and $\alpha_{10}$ are aspheric surface coefficients for even (greater than or equal to two) order terms.

First Embodiment

FIG. 1A is a schematic diagram showing an optical structure in accordance with a first embodiment of an optical lens of the present invention. The optical lens according to the first embodiment of the present invention comprises five pieces of lenses, which are a first lens L1, a second lens L2, a third lens L3, a fifth lens L5, and a fourth lens L4 arranged in order from the image side IMA to the object side OBJ. The optical lens utilizes two low-dispersion lenses L2 and L3 cooperating with three high-dispersion lenses L1, L4, and L5. The framework of its refractive power is negative, positive, negative, positive, and positive in order form the image side to the object side. Specifically, the first lens L1 is a lens having negative refractive power, and the image-side surface thereof is a concave face and has at least a point of inflection arranged thereon. The second lens L2 is a lens having positive refractive power and has a concave surface facing the object side and a convex surface facing the image side. The third lens L3 is approximate to a plano-concave lens. The fifth lens L5 is approximate to a meniscus convex lens. The fourth lens L4 is also approximate to a meniscus convex lens.

The optical lens according to the first embodiment of the present invention also has at least two aperture stops, that is, a first aperture stop STO1 and a second aperture stop STO2. The first aperture stop STO1 is disposed between the fourth lens L4 and the fifth lens L5 and the second aperture stop STO2 is disposed at the outside of the lens at the most object side (that is, the fourth lens L4). The distance on the optical axis from the first aperture stop STO1 to the image plane IP is SL1, the distance on the optical axis from the second aperture stop STO2 to the image plane IP is SL2, and the distance on the optical axis from the object-side surface of the lens at the most object side (that is, the fourth lens L4) to the image plane IP is TTL. The optical lens according to the first embodiment of the present invention satisfies the following equation: $1.2 < (SL1+SL2)/TTL < 2.5$.

As shown in Table 1 below, related data of the respective lenses of the optical lens shown in FIG. 1A are shown in the condition that the first aperture stop STO1 is in an active state and the second aperture stop STO2 is in an inactive state. Table 1 shows that the focal length of the optical lens according to the first embodiment of the present invention is 4.363, and the refractive power for the respective lenses sequentially is −6.54966, 20.2192, −4.7998, 4.1284, and 4.7496 in order from L1, L2, L3, L5, and L4. In the condition that the first aperture stop STO1 is in the active state, the effective f-number of this optical system is 1.8, the viewing angle is 76 degrees, and the total length of the optical lens is 5.21 mm. Further, in the condition that the second aperture stop STO2 is in the active state, the effective f-number of this optical system is 2.4.

TABLE 1

| Focal length = 4.36 mm F-number = 1.8 Maximum half angle of view = 38 | | | | | | |
|---|---|---|---|---|---|---|
| Surface Index | | Radius of Curvature R (mm) | Thickness/ Distance D (mm) | Refractive Index (Nd) | Abbe No. (Vd) | Conic Constant |
| R0 | Image Side | | | | | |
| R1 | IR | Plano | 0.399847 | 1.5168 | 64.16734 | 0 |
| R2 | | Plano | 0.145 | | | 0 |
| R3 | L1 | ∞ | 0.517358 | 1.535037 | 55.71072 | −7.31959 |
| R4 | | 3.224664 | 0.687077 | | | −37.468 |
| R5 | L2 | −6.84747 | 0.316889 | 1.651 | 21.5 | 12.32 |
| R6 | | −13.594 | 0.626108 | | | −3121.95 |
| R7 | L3 | −202.472 | 0.655789 | 1.651 | 21.5 | −7063.6 |
| R8 | | −3.109 | 0.232827 | | | 0 |
| R9 | L5 | −2.63506 | 0.038179 | 1.79679 | 45.35 | 0 |
| R10 | | −11.8121 | 0.530297 | | | 0 |
| R11 | STO1 | ∞ | 0.301989 | | | 0 |
| R12 | L4 | 4.492898 | 0.090208 | 1.58913 | 61.18217 | 0 |
| R13 | | 1.824606 | 0.67288 | | | −0.68912 |
| R14 | STO2 | ∞ | 0 | | | 0 |
| R15 | Object Side | | | | | |

Table 2 shows related data of aspheric lenses shown in Table 1.

TABLE 2

| | Coefficient on r^2 | Coefficient on r^4 | Coefficient on r^6 | Coefficient on r^8 | Coefficient on r^10 |
|---|---|---|---|---|---|
| IMA surface of L1 | 0 | −0.068326463 | 0.022631598 | −0.005707664 | 0.00079391 |
| | Coefficient on r^12 | Coeffieient on r^14 | Coefficient on r^16 | Coefficient on r^18 | Coefficient on r^20 |
| | −5.06E−05 | −5.04E−08 | 1.18281E−07 | 1.18281E−07 | 1.18281E−07 |
| OBJ surface of L1 | Coefficient on r^2 | Coefficient on r^4 | Coefficient on r^6 | Coefficient on r^8 | Coefficient on r^10 |
| | 0 | −0.16234125 | 0.063601191 | −0.014359732 | −0.000663867 |
| | Coefficient on r^12 | Coefficient on r^14 | Coefficient on r^16 | Coefficient on r^18 | Coefficient on r^20 |
| | 0.000669046 | −5.70E−06 | −1.02112E−05 | −1.02112E−05 | −1.02112E−05 |
| IMA surface of L2 | Coefficient on r^2 | Coefficient on r^4 | Coefficient on r^6 | Coefficient on r^8 | Coefficient on r^10 |
| | 0 | −0.037355326 | 0.056839178 | −0.047227199 | 0.017140171 |
| | Coefficient on r^12 | Coefficient on r^14 | Coefficient on r^16 | Coefficient on r^18 | Coefficient on r^20 |
| | −0.002734669 | −7.68765E−05 | 6.53917E−05 | 6.53917E−05 | 6.53917E−05 |
| OBJ surface of L2 | Coefficient on r^2 | Coefficient on r^4 | Coefficient on r^6 | Coefficient on r^8 | Coefficient on r^10 |
| | 0 | −0.046389552 | 0.054728295 | −0.087083506 | 0.053893156 |
| | Coefficient on r^12 | Coefficient on r^14 | Coefficient on r^16 | Coefficient on r^18 | Coefficient on r^20 |
| | −0.016201546 | 0.000158368 | 0.000723711 | 0.000723711 | 0.000723711 |
| IMA surface of L3 | Coefficient on r^2 | Coefficient on r^4 | Coefficient on r^6 | Coefficient on r^8 | Coefficient on r^10 |
| | 0 | −0.064112847 | 0.017941495 | 0.038314249 | −0.029126597 |
| | Coefficient on r^12 | Coefficient on r^14 | Coefficient on r^16 | Coefficient on r^18 | Coefficient on r^20 |
| | 0.008533352 | 0.002185878 | −0.000751704 | −0.000751704 | −0.000751704 |
| OBJ surface of L3 | Coefficient on r^2 | Coefficient on r^4 | Coefficient on r^6 | Coefficient on r^8 | Coefficient on r^10 |
| | 0 | −0.072558289 | −0.015939819 | 0.077639598 | −0.013915421 |
| | Coefficient on r^12 | Coefficient on r^14 | Coefficient on r^16 | Coefficient on r^18 | Coefficient on r^20 |
| | −0.02624593 | 0.00666058 | −0.000299104 | −0.000299104 | −0.000299104 |
| IMA surface of L4 | Coefficient on r^2 | Coefficient on r^4 | Coefficient on r^6 | Coefficient on r^8 | Coefficient on r^10 |
| | 0 | −0.013943442 | 0.020475405 | −0.057163629 | 0.023398376 |
| | Coefficient on r^12 | Coefficient on r^14 | Coefficient on r^16 | Coefficient on r^18 | Coefficient on r^20 |
| | 0.012274819 | −0.012467014 | −0.000474625 | −0.000474625 | −0.000474625 |
| OBJ surface | Coefficient on r^2 | Coefficient on r^4 | Coefficient on r^6 | Coefficient on r^8 | Coefficient on r^10 |
| | 0 | 0.006641832 | 0.01166876 | −0.001369296 | −0.022192564 |

TABLE 2-continued

| | | | | | |
|---|---|---|---|---|---|
| of L4 | Coefficient on r^12 | Coefficient on r^14 | Coefficient on r^16 | Coefficient on r^18 | Coefficient on r^20 |
| | 0.025460709 | −0.011215628 | 0.000876751 | 0.000376751 | 0.000876751 |
| IMA surface of L5 | Coefficient on r^2 | Coefficient on r^4 | Coefficient on r^6 | Coefficient on r^8 | Coefficient on r^10 |
| | 0 | −0.013306555 | −0.034459418 | 0.011549355 | 0.044164219 |
| | Coefficient on r^12 | Coefficient on r^14 | Coefficient on r^16 | Coefficient on r^18 | Coefficient on r^20 |
| | −0.047675783 | 0.004435779 | 0.004355224 | 0.004355224 | 0.004355224 |
| OBJ surface of L5 | Coefficient on r^2 | Coefficient on r^4 | Coefficient on r^6 | Coefficient on r^8 | Coefficient on r^10 |
| | 0 | −0.02213491 | −0.023906357 | 0.000935276 | 0.011708534 |
| | Coefficient on r^12 | Coefficient on r^14 | Coefficient on r^16 | Coefficient on r^18 | Coefficient on r^20 |
| | −0.028121262 | 0.009003516 | 0.002926885 | 0.002926385 | 0.002926885 |

Figure 1B:
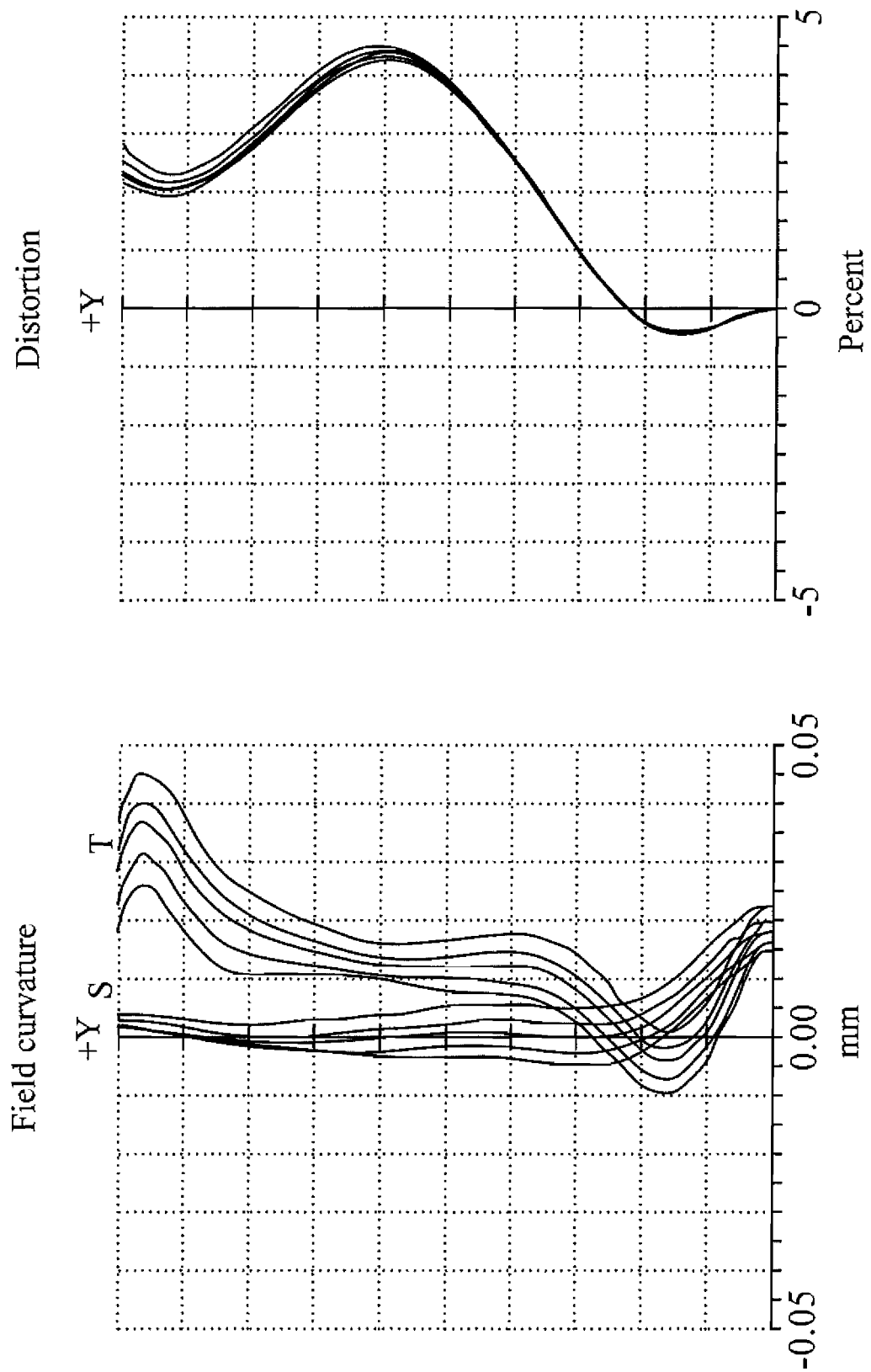
FIG. 1B is a diagram showing the optical performance including field curvature and distortion of the optical lens according to the first embodiment of the present invention in the condition that a first aperture stop is in an active state and a second aperture stop is in an inactive state.
Figure 1C:
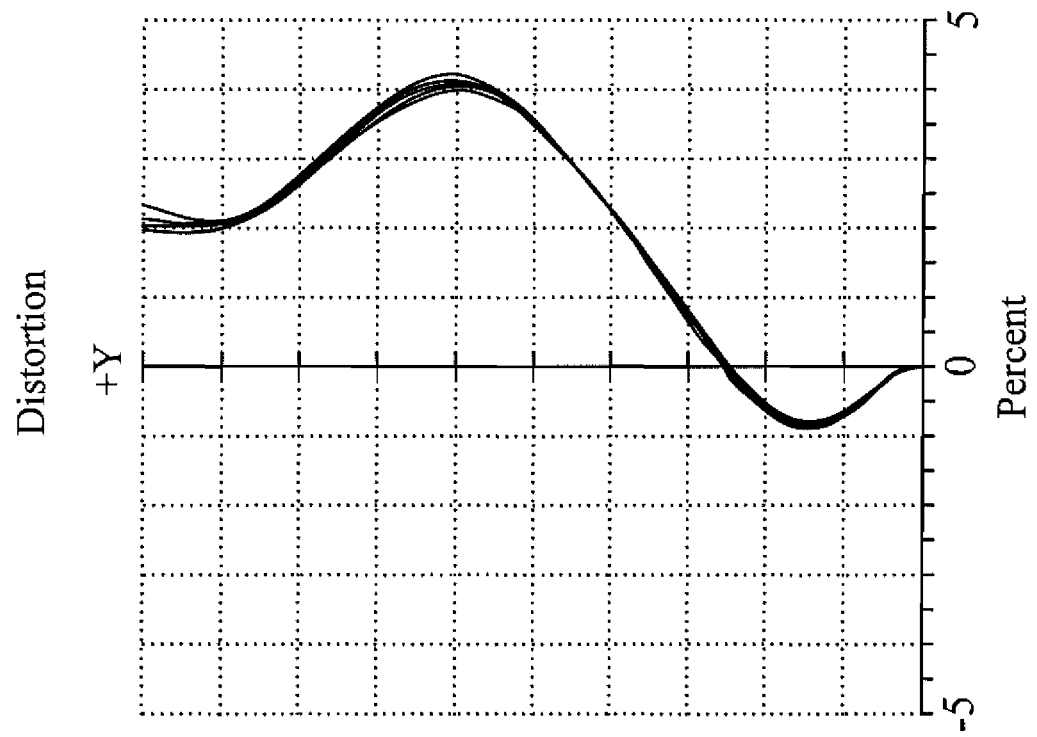
FIG. 1C is a diagram showing the optical performance including field curvature and distortion of the optical lens according to the first embodiment of the present invention in the condition that the first aperture stop is in the inactive state and the second aperture stop is in the active state.
Figure 1C:
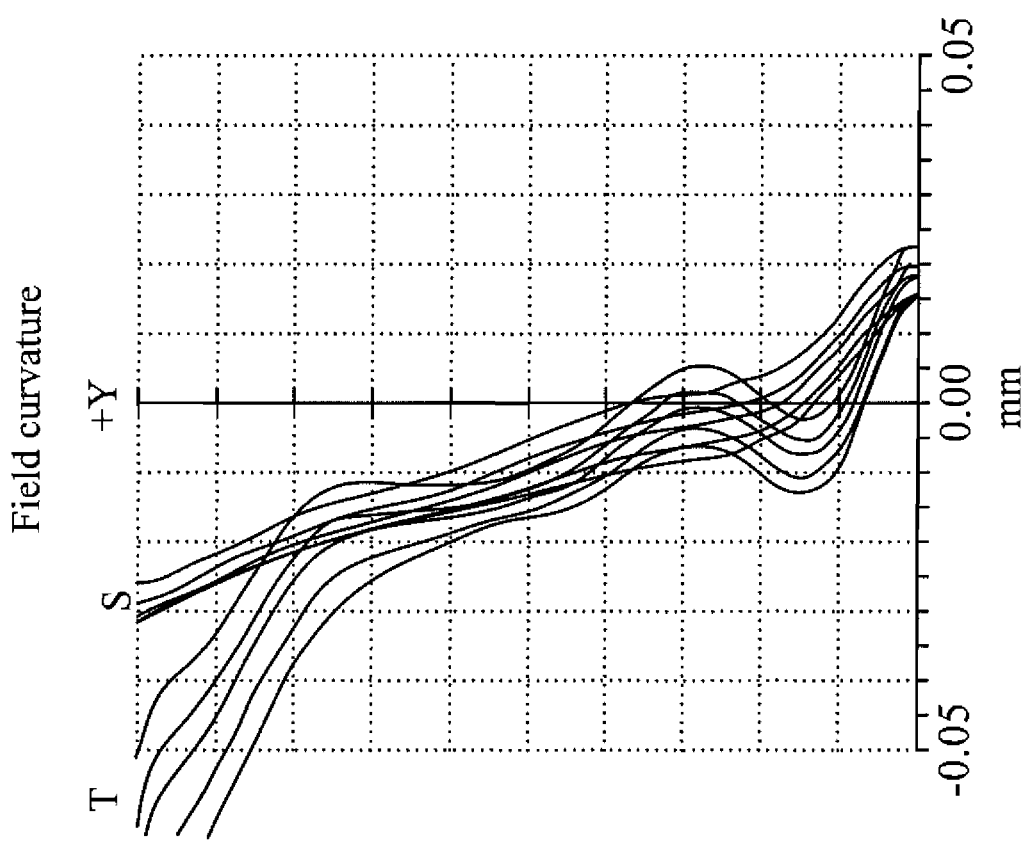
Figure 1D:
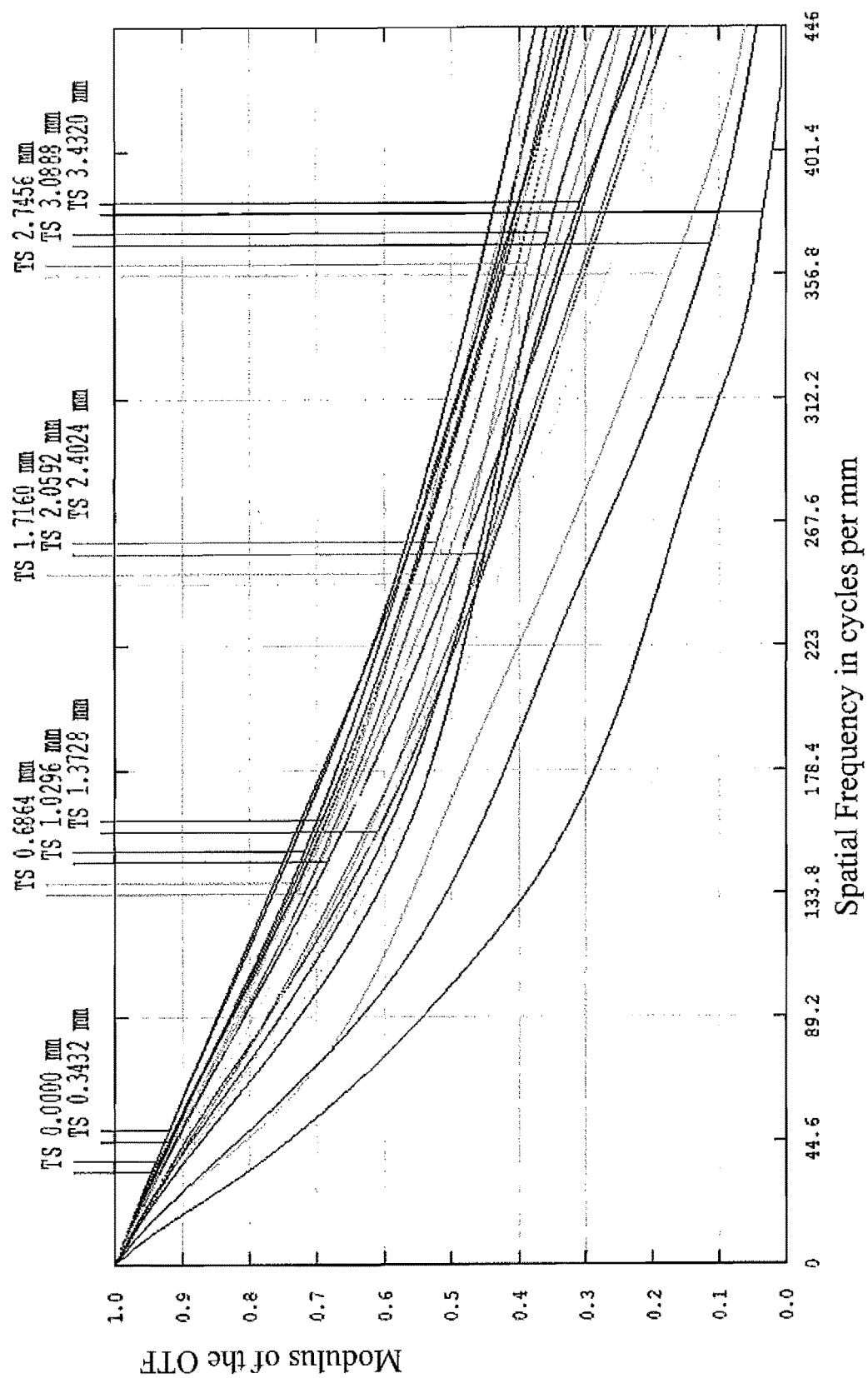
FIG. 1D is a diagram showing polychromatic diffraction modulation transfer function (MTF) of the optical lens according to the first embodiment of the present invention in the condition that the first aperture stop is in the active state and the second aperture stop is in the inactive state.
Figure 1E:
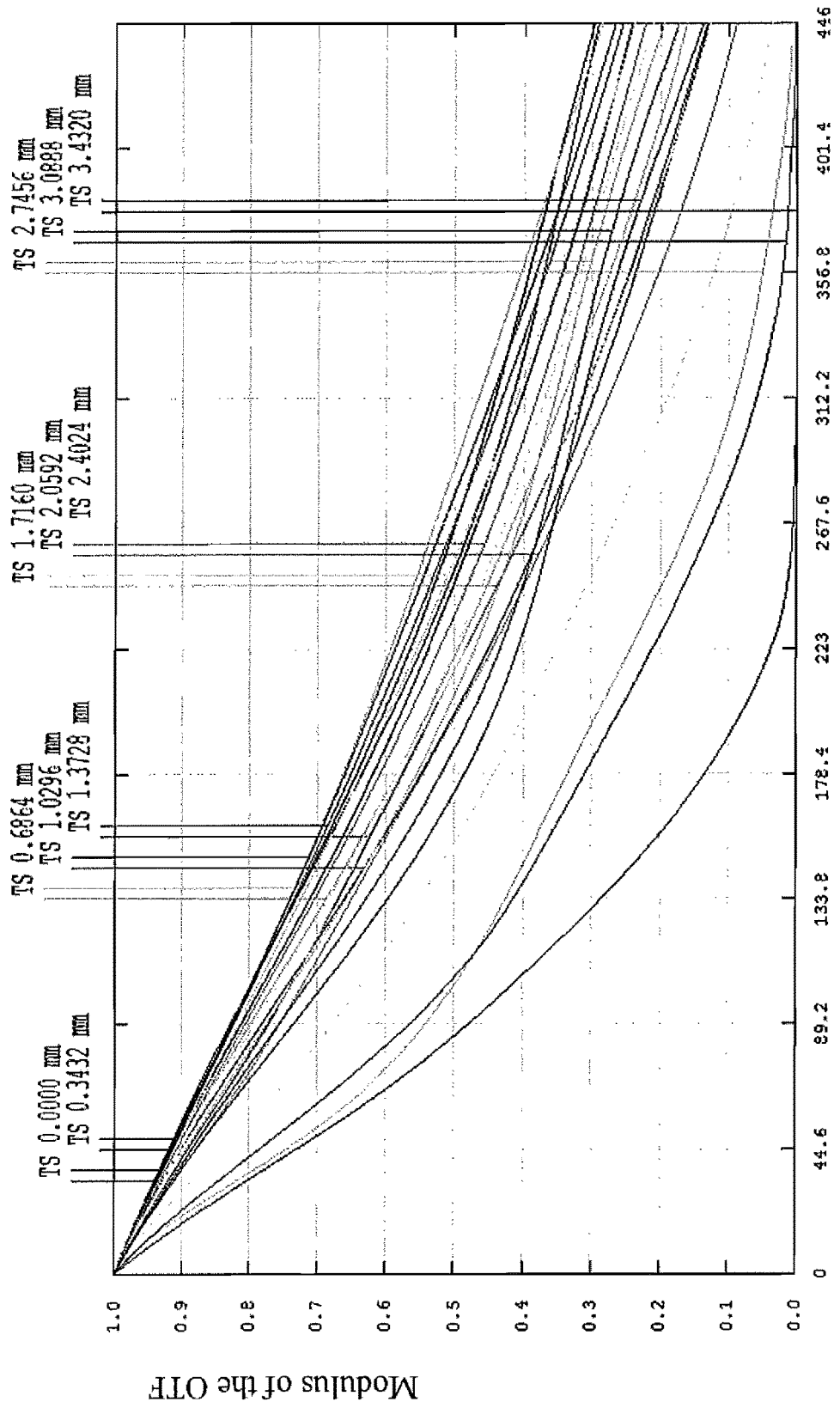
FIG. 1E is a diagram showing polychromatic diffraction modulation transfer function of the optical lens according to the first embodiment of the present invention in the condition that the first aperture stop is in the inactive state and the second aperture stop is in the active state.

FIG. 1B is a diagram showing the optical performance including field curvature and distortion of the optical lens according to the first embodiment of the present invention in the condition that the first aperture stop STO1 is in the active state and the second aperture stop STO2 is in the inactive state. FIG. 1C is a diagram showing the optical performance including field curvature and distortion of the optical lens according to the first embodiment of the present invention in the condition that the first aperture stop STO1 is in the inactive state and the second aperture stop STO2 is in the active state. FIG. 1D is a diagram showing polychromatic diffraction modulation transfer function (MTF) of the optical lens according to the first embodiment of the present invention in the condition that the first aperture stop STO1 is in the active state and the second aperture stop STO2 is in the inactive state. FIG. 1E is a diagram showing polychromatic diffraction modulation transfer function of the optical lens according to the first embodiment of the present invention in the condition that the first aperture stop STO1 is in the inactive state and the second aperture stop STO2 is in the active state.

Second Embodiment

FIG. 2A is a schematic diagram showing an optical structure in accordance with a second embodiment of an optical lens of the present invention. The optical lens according to the second embodiment of the present invention comprises five pieces of lenses, which are a first lens L1, a second lens L2, a third lens L3, a fifth lens L5, and a fourth lens L4 arranged in order from the image side IMA to the object side OBJ. The optical lens utilizes one low-dispersion lens L5 cooperating with four high-dispersion lenses L1, L2, L3, and L4. The framework of its refractive power is negative, positive, positive, negative, and positive in order form the image side to the object side. Specifically, the first lens L1 is a lens having negative refractive power, and the image-side surface thereof is a concave face and has at least a point of inflection arranged thereon. The second lens L2 is a lens having positive refractive power and has a concave surface facing the object side and a convex surface facing the image side. The third lens L3 is approximate to a bi-convex lens. The fifth lens L5 is approximate to a meniscus concave lens. The fourth lens L4 is approximate to a bi-convex lens.

The optical lens according to the second embodiment of the present invention also has at least two aperture stops, that is, a first aperture stop STO1 and a second aperture stop STO2. The first aperture stop STO1 is disposed between the fourth lens L4 and the fifth lens L5 and the second aperture stop STO2 is disposed at the outside of the lens at the most object side (that is, the fourth lens L4). The distance on the optical axis from the first aperture stop STO1 to the image plane IP is SL1, the distance on the optical axis from the second aperture stop STO2 to the image plane IP is SL2, and the distance on the optical axis from the object-side surface of the lens at the most object side (that is, the fourth lens L4) to the image plane IP is TTL. The optical lens according to the second embodiment of the present invention satisfies the following equation: $1.2<(SL1+SL2)/TTL<2.5$.

As shown in Table 3 below, related data of the respective lenses of the optical lens shown in FIG. 2A are shown in the condition that the first aperture stop STO1 is in an active state and the second aperture stop STO2 is in an inactive state. Table 3 shows that the focal length of the optical lens according to the second embodiment of the present invention is 3.29213, and the refractive power for the respective lenses sequentially is −2.46914, 3.08563, 7.68479, −3.58248, and 2.46913 in order from L1, L2, L3, L5, and L4. In the condition that the first aperture stop STO1 is in the active state, the effective f-number of this optical system is 2.0, the viewing angle is 69 degrees, and the total length of the optical lens is 3.97 mm. Further, in the condition that the second aperture stop STO2 is in the active state, the effective f-number of this optical system is 2.8.

TABLE 3

| Focal length = 3.29 mm F-number = 2.0 Maximum half angle of view = 34.5 | | | | | |
|---|---|---|---|---|---|
| Surface Index | | Radius of Curvature R (mm) | Thickness/ Distance D (mm) | Refractive Index (Nd) | Abbe No. (Vd) | Conic Constant |
| R0 | Image Side | | | | | |
| R1 | IR | Plano | 0.004258 | 1.5168 | 64.16734 | 0 |
| R2 | | Plano | 0.145 | | | 0 |
| R3 | L1 | ∞ | 0.88 | 1.5441 | 56.0936 | −6.35903 |
| R4 | | 4.088057 | 0.378762 | | | −133.327 |
| R5 | L2 | −1.05192 | 0.238975 | 1.5441 | 56.0936 | −0.77093 |
| R6 | | −2.37771 | 0.450713 | | | 0.179669 |
| R7 | L3 | −6.89504 | 0.464627 | 1.5441 | 56.0936 | 28.14493 |
| R8 | | 10.49814 | 0.390025 | | | 20.16273 |
| R9 | L5 | 1.193641 | 0.364742 | 1.635517 | 23.97184 | −6.08747 |
| R10 | | 2.664022 | 0.215475 | | | −35.7261 |

TABLE 3-continued

Focal length = 3.29 mm F-number = 2.0 Maximum half angle of view = 34.5

| Surface Index | | Radius of Curvature R (mm) | Thickness/ Distance D (mm) | Refractive Index (Nd) | Abbe No. (Vd) | Conic Constant |
|---|---|---|---|---|---|---|
| R11 | STO1 | ∞ | 0.036573 | | | 0 |
| R12 | L4 | −6.82072 | −0.00473 | 1.5441 | 56.0936 | 7.335077 |
| R13 | | 1.644252 | 0.408306 | | | 0.125673 |
| R14 | STO2 | ∞ | 0 | | | 0 |
| R15 | Object Side | | | | | |

Table 4 shows related data of aspheric lenses shown in Table 3.

TABLE 4

| | Coefficient on $r^2$ | Coefficient on $r^4$ | Coefficient on $r^6$ | Coefficient on $r^8$ | Coefficient on $r^{10}$ |
|---|---|---|---|---|---|
| IMA surface of L1 | 0 | −0.12261161 | 0.049977706 | −0.017665442 | 0.003089853 |
| | Coefficient on $r^{12}$ | Coefficient on $r^{14}$ | Coefficient on $r^{16}$ | Coefficient on $r^{18}$ | Coefficient on $r^{20}$ |
| | −2.24E−04 | 0.00E+00 | 0 | 0 | 0 |
| OBJ surface of L1 | Coefficient on $r^2$ | Coefficient on $r^4$ | Coefficient on $r^6$ | Coefficient on $r^8$ | Coefficient on $r^{10}$ |
| | 0 | −0.16359498 | 0.04211978 | −0.001194497 | −0.000624809 |
| | Coefficient on $r^{12}$ | Coefficient on $r^{14}$ | Coefficient on $r^{16}$ | Coefficient on $r^{18}$ | Coefficient on $r^{20}$ |
| | 4.89916E−05 | 0.00E+00 | 0 | 0 | 0 |
| IMA surface of L2 | Coefficient on $r^2$ | Coefficient on $r^4$ | Coefficient on $r^6$ | Coefficient on $r^8$ | Coefficient on $r^{10}$ |
| | 0 | 0.24409123 | −0.17355054 | 0.070243881 | −0.004203009 |
| | Coefficient on $r^{12}$ | Coefficient on $r^{14}$ | Coefficient on $r^{16}$ | Coefficient on $r^{18}$ | Coefficient on $r^{20}$ |
| | −0.000699114 | 0 | 0 | 0 | 0 |
| OBJ surface of L2 | Coefficient on $r^2$ | Coefficient on $r^4$ | Coefficient on $r^6$ | Coefficient on $r^8$ | Coefficient on $r^{10}$ |
| | 0 | 0.038536069 | −0.11142259 | 0.013661737 | −0.021625202 |
| | Coefficient on $r^{12}$ | Coefficient on $r^{14}$ | Coefficient on $r^{16}$ | Coefficient on $r^{18}$ | Coefficient on $r^{20}$ |
| | −0.013949816 | 0 | 0 | 0 | 0 |
| IMA surface of L3 | Coefficient on $r^2$ | Coefficient on $r^4$ | Coefficient on $r^6$ | Coefficient on $r^8$ | Coefficient on $r^{10}$ |
| | 0 | −0.055902836 | −0.038874183 | 0.017980386 | −0.028521372 |
| | Coefficient on $r^{12}$ | Coefficient on $r^{14}$ | Coefficient on $r^{16}$ | Coefficient on $r^{18}$ | Coefficient on $r^{20}$ |
| | 0.042884788 | 0 | 0 | 0 | 0 |
| OBJ surface of L3 | Coefficient on $r^2$ | Coefficient on $r^4$ | Coefficient on $r^6$ | Coefficient on $r^8$ | Coefficient on $r^{10}$ |
| | 0 | −0.051388901 | −0.03247322 | 0.15238218 | −0.077963205 |
| | Coefficient on $r^{12}$ | Coefficient on $r^{14}$ | Coefficient on $r^{16}$ | Coefficient on $r^{18}$ | Coefficient on $r^{20}$ |
| | −0.013538712 | 0 | 0 | 0 | 0 |
| IMA surface of L4 | Coefficient on $r^2$ | Coefficient on $r^4$ | Coefficient on $r^6$ | Coefficient on $r^8$ | Coefficient on $r^{10}$ |
| | 0 | 0.13622006 | −0.16886925 | 0.34374751 | −0.58600811 |
| | Coefficient on $r^{12}$ | Coefficient on $r^{14}$ | Coefficient on $r^{16}$ | Coefficient on $r^{18}$ | Coefficient on $r^{20}$ |
| | 0.4616599 | 0 | 0 | 0 | 0 |
| OBJ surface of L4 | Coefficient on $r^2$ | Coefficient on $r^4$ | Coefficient on $r^6$ | Coefficient on $r^8$ | Coefficient on $r^{10}$ |
| | 0 | 0.009462623 | −0.012480374 | −0.01772093 | 0.044712063 |
| | Coefficient on $r^{12}$ | Coefficient on $r^{14}$ | Coefficient on $r^{16}$ | Coefficient on $r^{18}$ | Coefficient on $r^{20}$ |
| | 0.013373029 | 0 | 0 | 0 | 0 |
| IMA surface of L5 | Coefficient on $r^2$ | Coefficient on $r^4$ | Coefficient on $r^6$ | Coefficient on $r^8$ | Coefficient on $r^{10}$ |
| | 0 | 0.044795139 | 0.11055632 | −0.15080884 | −0.070661935 |
| | Coefficient on $r^{12}$ | Coefficient on $r^{14}$ | Coefficient on $r^{16}$ | Coefficient on $r^{18}$ | Coefficient on $r^{20}$ |
| | 0.095626162 | 0 | 0 | 0 | 0 |
| OBJ surface of L5 | Coefficient on $r^2$ | Coefficient on $r^4$ | Coefficient on $r^6$ | Coefficient on $r^8$ | Coefficient on $r^{10}$ |
| | 0 | 0.040196019 | −0.090194898 | 0.2241962 | −0.41489922 |
| | Coefficient on $r^{12}$ | Coefficient on $r^{14}$ | Coefficient on $r^{16}$ | Coefficient on $r^{18}$ | Coefficient on $r^{20}$ |
| | 0.22564468 | 0 | 0 | 0 | 0 |

Figure 2B:
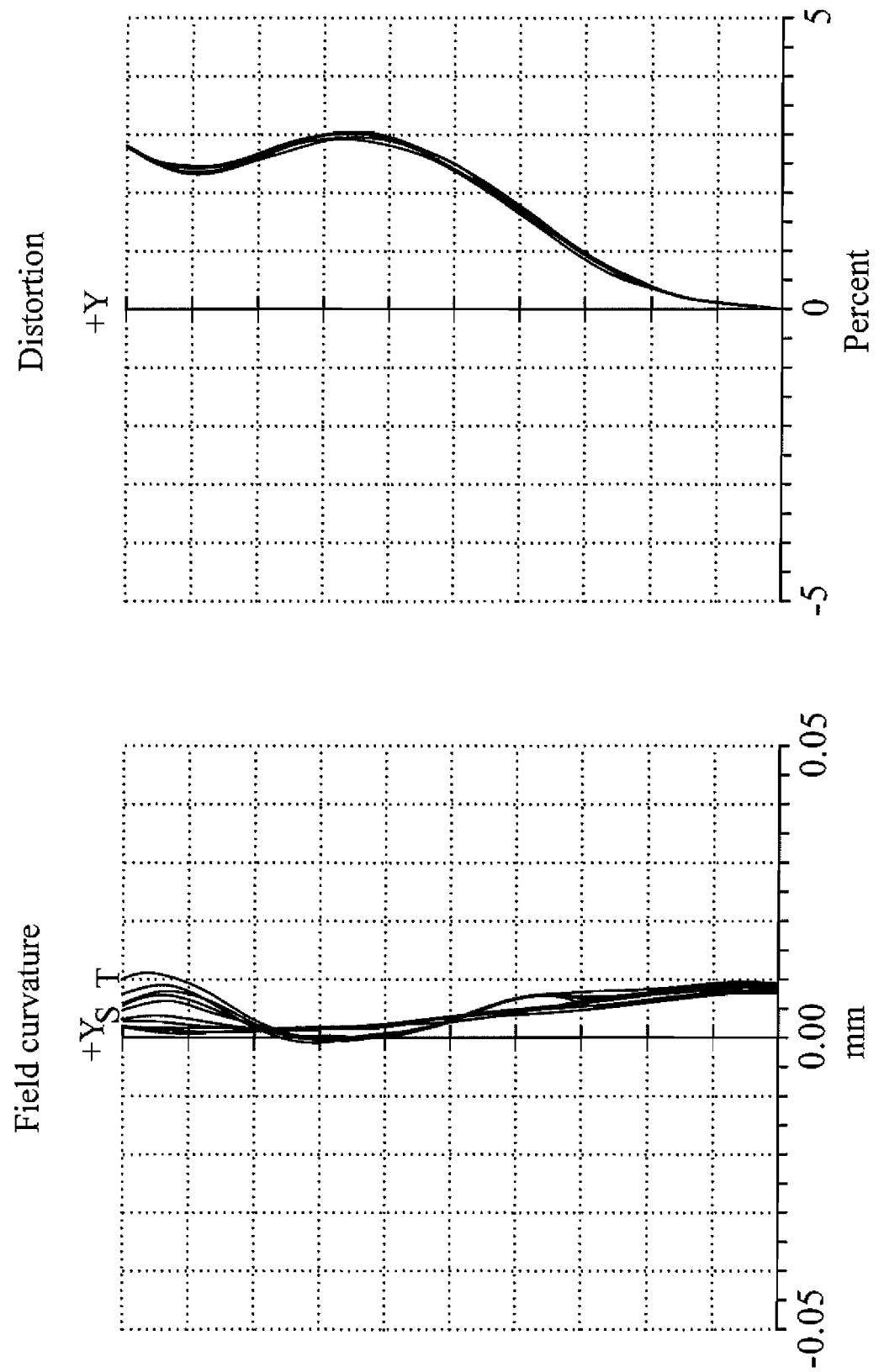
FIG. 2B is a diagram showing the optical performance including field curvature and distortion of the optical lens according to the second embodiment of the present invention in the condition that a first aperture stop is in an active state and a second aperture stop is in an inactive state.
Figure 2C:
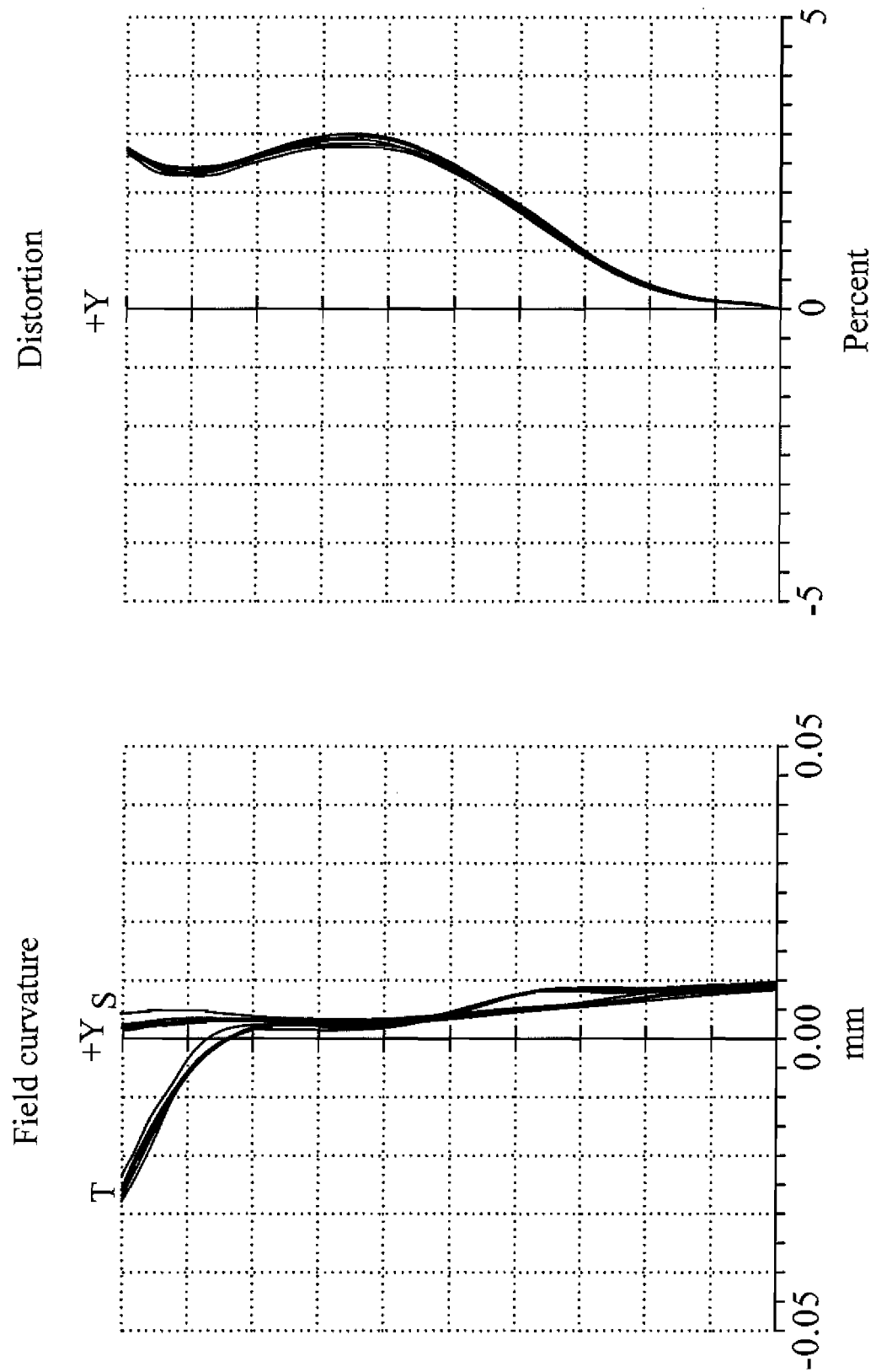
FIG. 2C is a diagram showing the optical performance including field curvature and distortion of the optical lens according to the second embodiment of the present invention in the condition that the first aperture stop is in the inactive state and the second aperture stop is in the active state.
Figure 2D:
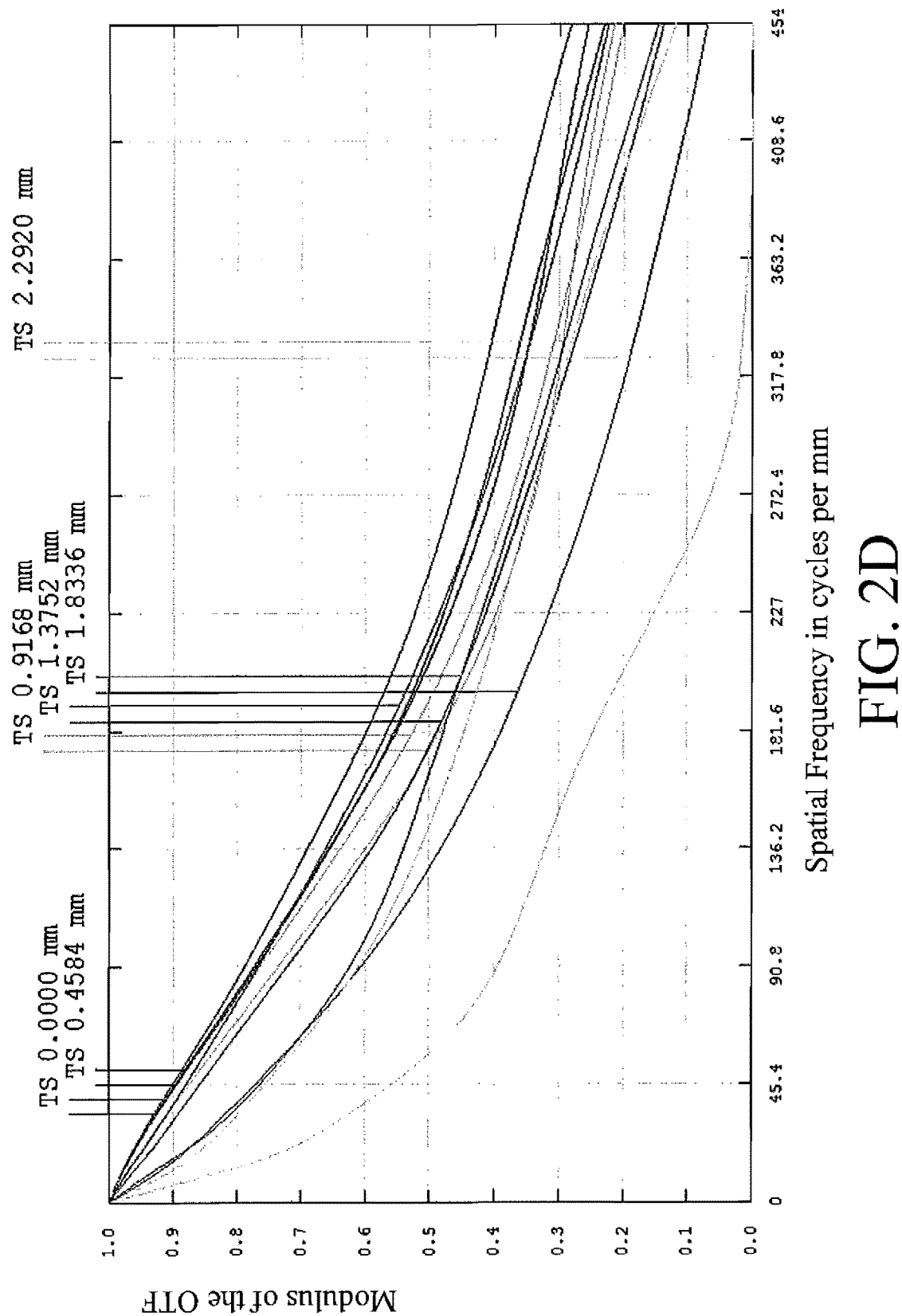
FIG. 2D is a diagram showing polychromatic diffraction modulation transfer function (MTF) of the optical lens according to the second embodiment of the present invention in the condition that the first aperture stop is in the active state and the second aperture stop is in the inactive state.
Figure 2E:
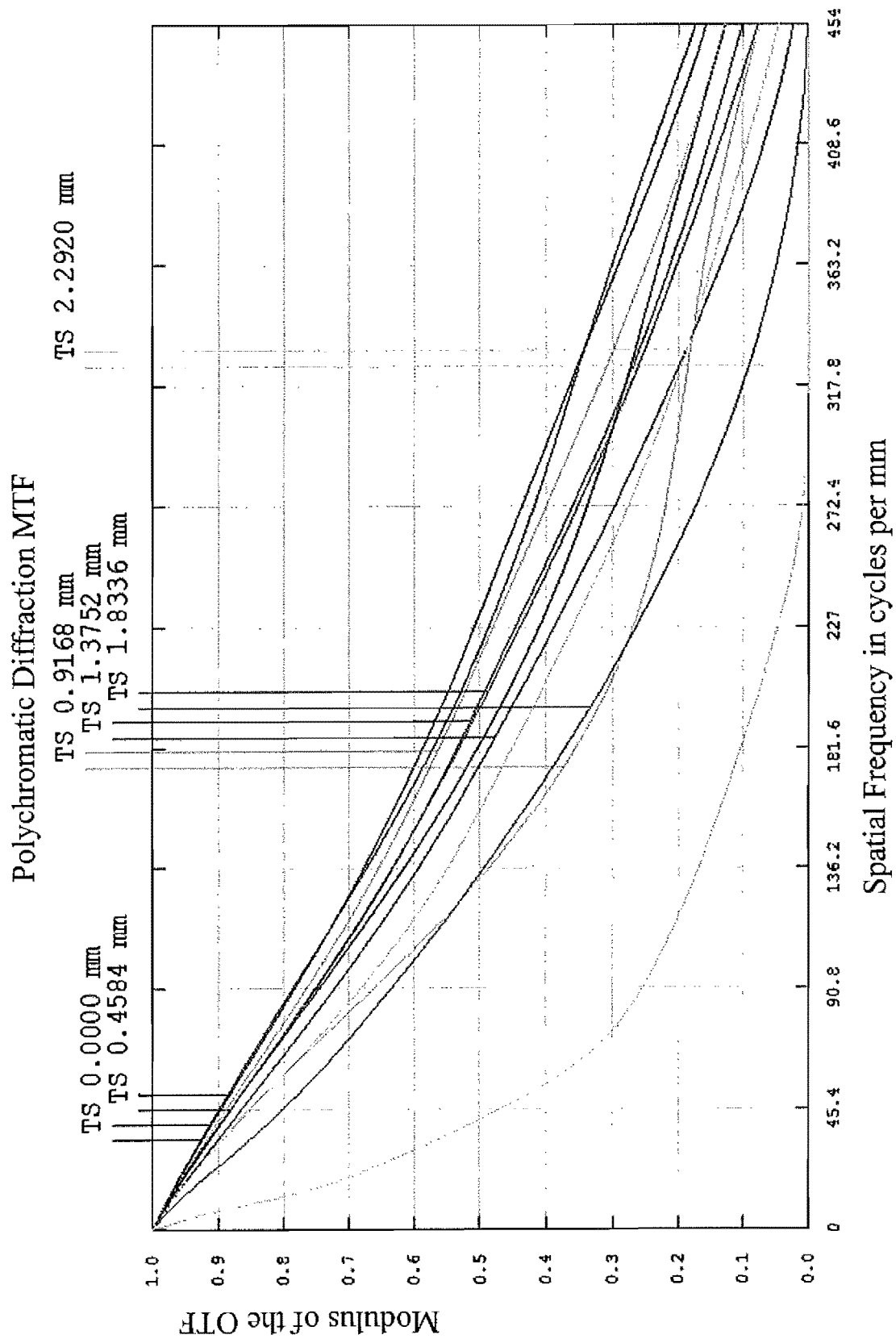
FIG. 2E is a diagram showing polychromatic diffraction modulation transfer function of the optical lens according to the second embodiment of the present invention in the condition that the first aperture stop is in the inactive state and the second aperture stop is in the active state.

FIG. 2B is a diagram showing the optical performance including field curvature and distortion of the optical lens according to the second embodiment of the present invention in the condition that the first aperture stop STO1 is in the active state and the second aperture stop STO2 is in the inactive state. FIG. 2C is a diagram showing the optical performance including field curvature and distortion of the optical lens according to the second embodiment of the present invention in the condition that the first aperture stop STO1 is in the inactive state and the second aperture stop STO2 is in the active state. FIG. 2D is a diagram showing polychromatic diffraction modulation transfer function (MTF) of the optical lens according to the second embodiment of the present invention in the condition that the first aperture stop STO1 is in the active state and the second aperture stop STO2 is in the inactive state. FIG. 2E is a diagram showing polychromatic diffraction modulation transfer function of the optical lens according to the second embodiment of the present invention in the condition that the first aperture stop STO1 is in the inactive state and the second aperture stop STO2 is in the active state.

Third Embodiment

FIG. 3A is a schematic diagram showing an optical structure in accordance with a third embodiment of an optical lens of the present invention. The optical lens according to the third embodiment of the present invention comprises four pieces of lenses, which are a first lens L1, a second lens L2, a third lens L3, and a fourth lens L4 arranged in order from the image side IMA to the object side OBJ. The optical lens utilizes one low-dispersion lens L3 cooperating with three high-dispersion lenses L1, L2, and L4. The framework of its refractive power is negative, positive, negative, and positive in order form the image side to the object side. Specifically, the first lens L1 is a lens having negative refractive power, and the image-side surface thereof is a concave face and has at least a point of inflection arranged thereon. The second lens L2 is a lens having positive refractive power and has a concave surface facing the object side and a convex surface facing the image side. The third lens L3 is approximate to a meniscus concave lens. The fourth lens L4 is approximate to a bi-convex lens.

The optical lens according to the third embodiment of the present invention also has at least two aperture stops, that is, a first aperture stop STO1 and a second aperture stop STO2. The first aperture stop STO1 is disposed between the third lens L3 and the fourth lens L4 and the second aperture stop STO2 is disposed at the outside of the lens at the most object side (that is, the fourth lens L4). The distance on the optical axis from the first aperture stop STO1 to the image plane IP is SL1, the distance on the optical axis from the second aperture stop STO2 to the image plane IP is SL2, and the distance on the optical axis from the object-side surface of the lens at the most object side (that is, the fourth lens L4) to the image plane IP is TTL. The optical lens according to the third embodiment of the present invention satisfies the following equation: $1.2<(SL1+SL2)/TTL<2.5$.

As shown in Table 5 below, related data of the respective lenses of the optical lens shown in FIG. 3A are shown in the condition that the first aperture stop STO1 is in an active state and the second aperture stop STO2 is in an inactive state. Table 5 shows that the focal length of the optical lens according to the third embodiment of the present invention is 2.224, and the refractive power for the respective lenses sequentially is −1.27834, 1.15622, −2.82002, and 1.81389 in order from L1, L2, L3, and L4. In the condition that the first aperture stop STO1 is in the active state, the effective f-number of this optical system is 1.8, the viewing angle is 70 degrees, and the total length of the optical lens is 3.09 mm. Further, in the condition that the second aperture stop STO2 is in the active state, the effective f-number of this optical system is 2.4.

TABLE 5

| Focal length = 2.22 mm F-number = 1.8 Maximum half angle of view = 35 | | | | | |
|---|---|---|---|---|---|
| Surface Index | | Radius of Curvature R (mm) | Thickness/ Distance D (mm) | Refractive Index (Nd) | Abbe No. (Vd) | Conic Constant |
| R0 | Image Side | | | | | |
| R1 | IR | Plano | 0.377173 | 1.51633 | 64.14202 | 0 |
| R2 | | Plano | 0.3 | | | 0 |
| R3 | L1 | 0.634243 | 0.3 | 1.5441 | 56.0936 | −7.33354 |
| R4 | | 8.27339 | 0.33814 | | | −10914.7 |
| R5 | L2 | −0.65879 | 0.035445 | 1.69003 | 52.75 | −3.17751 |
| R6 | | −2.65838 | 0.459447 | | | −8.45873 |
| R7 | L3 | 1.547733 | 0.397755 | 1.632755 | 23.29495 | −5.06099 |
| R8 | | 11.75026 | 0.229978 | | | 0 |
| R9 | STO1 | ∞ | 0.075473 | | | 0 |
| R10 | L4 | −3.3504 | −0.04548 | 1.54 | 56.0936 | 0 |
| R11 | | 1.313104 | 0.623902 | | | 0.124189 |
| R12 | STO2 | ∞ | 0 | | | 0 |
| R13 | Object Side | | | | | |

Table 6 shows related data of aspheric lenses shown in Table 5.

TABLE 6

| | Coefficient on $r^2$ | Coefficient on $r^4$ | Coefficient on $r^6$ | Coefficient on $r^8$ | Coefficient on $r^{10}$ |
|---|---|---|---|---|---|
| IMA surface of L1 | 0 | −0.28029487 | 0.22709754 | −0.15016616 | 0.034805119 |
| | Coefficient on $r^{12}$ | Coefficient on $r^{14}$ | Coefficient on $r^{16}$ | Coefficient on $r^{18}$ | Coefficient on $r^{20}$ |
| | −0.001965392 | 0.003020866 | −0.001881296 | −0.001881296 | −0.001881296 |
| OBJ surface of L1 | Coefficient on $r^2$ | Coefficient on $r^4$ | Coefficient on $r^6$ | Coefficient on $r^8$ | Coefficient on $r^{10}$ |
| | 0 | −0.28339184 | 0.21241489 | −0.093783116 | −0.033079793 |
| | Coefficient on $r^{12}$ | Coefficient on $r^{14}$ | Coefficient on $r^{16}$ | Coefficient on $r^{18}$ | Coefficient on $r^{20}$ |
| | 0.017751576 | −0.023275011 | 0.028276075 | 0.028276075 | 0.028276075 |
| IMA surface of L2 | Coefficient on $r^2$ | Coefficient on $r^4$ | Coefficient on $r^6$ | Coefficient on $r^8$ | Coefficient on $r^{10}$ |
| | 0 | 0.056170984 | −0.75262164 | 1.8432287 | −1.4175232 |
| | Coefficient on $r^{12}$ | Coefficient on $r^{14}$ | Coefficient on $r^{16}$ | Coefficient on $r^{18}$ | Coefficient on $r^{20}$ |
| | −0.81543338 | 1.2821335 | 0 | 0 | 0 |
| OBJ surface of L2 | Coefficient on $r^2$ | Coefficient on $r^4$ | Coefficient on $r^6$ | Coefficient on $r^8$ | Coefficient on $r^{10}$ |
| | 0 | 0.004277422 | 0.014660242 | −0.024193322 | 0.18893841 |
| | Coefficient on $r^{12}$ | Coefficient on $r^{14}$ | Coefficient on $r^{16}$ | Coefficient on $r^{18}$ | Coefficient on $r^{20}$ |
| | −1.7521547 | 2.2681374 | 0 | 0 | 0 |
| IMA surface of L3 | Coefficient on $r^2$ | Coefficient on $r^4$ | Coefficient on $r^6$ | Coefficient on $r^8$ | Coefficient on $r^{10}$ |
| | 0 | 0.12014168 | −0.039058636 | −0.73253478 | 4.5037627 |
| | Coefficient on $r^{12}$ | Coefficient on $r^{14}$ | Coefficient on $r^{16}$ | Coefficient on $r^{18}$ | Coefficient on $r^{20}$ |
| | 4.6527637 | 0 | 0 | 0 | 0 |
| OBJ surface of L3 | Coefficient on $r^2$ | Coefficient on $r^4$ | Coefficient on $r^6$ | Coefficient on $r^8$ | Coefficient on $r^{10}$ |
| | 0 | −0.13331015 | −1.0335069 | 5.1431284 | 4.7487291 |
| | Coefficient on $r^{12}$ | Coefficient on $r^{14}$ | Coefficient on $r^{16}$ | Coefficient on $r^{18}$ | Coefficient on $r^{20}$ |
| | −1.1243573 | 0 | 0 | 0 | 0 |
| IMA surface | Coefficient on $r^2$ | Coefficient on $r^4$ | Coefficient on $r^6$ | Coefficient on $r^8$ | Coefficient on $r^{10}$ |
| | 0 | −0.015180883 | −1.1936464 | 4.9505495 | −5.7629299 |

TABLE 6-continued

| | | | | | |
|---|---|---|---|---|---|
| of L4 | Coefficient on r^12 0 | Coefficient on r^14 0 | Coefficient on r^16 0 | Coefficient on r^18 0 | Coefficient on r^20 0 |
| OBJ surface of L4 | Coefficient on r^2 0 | Coefficient on r^4 −0.047670449 | Coefficient on r^6 −0.1274337 | Coefficient on r^8 0.12082106 | Coefficient on r^10 −0.45177542 |
| | Coefficient on r^12 0 | Coefficient on r^14 0 | Coefficient on r^16 0 | Coefficient on r^18 0 | Coefficient on r^20 0 |

Figure 3B:
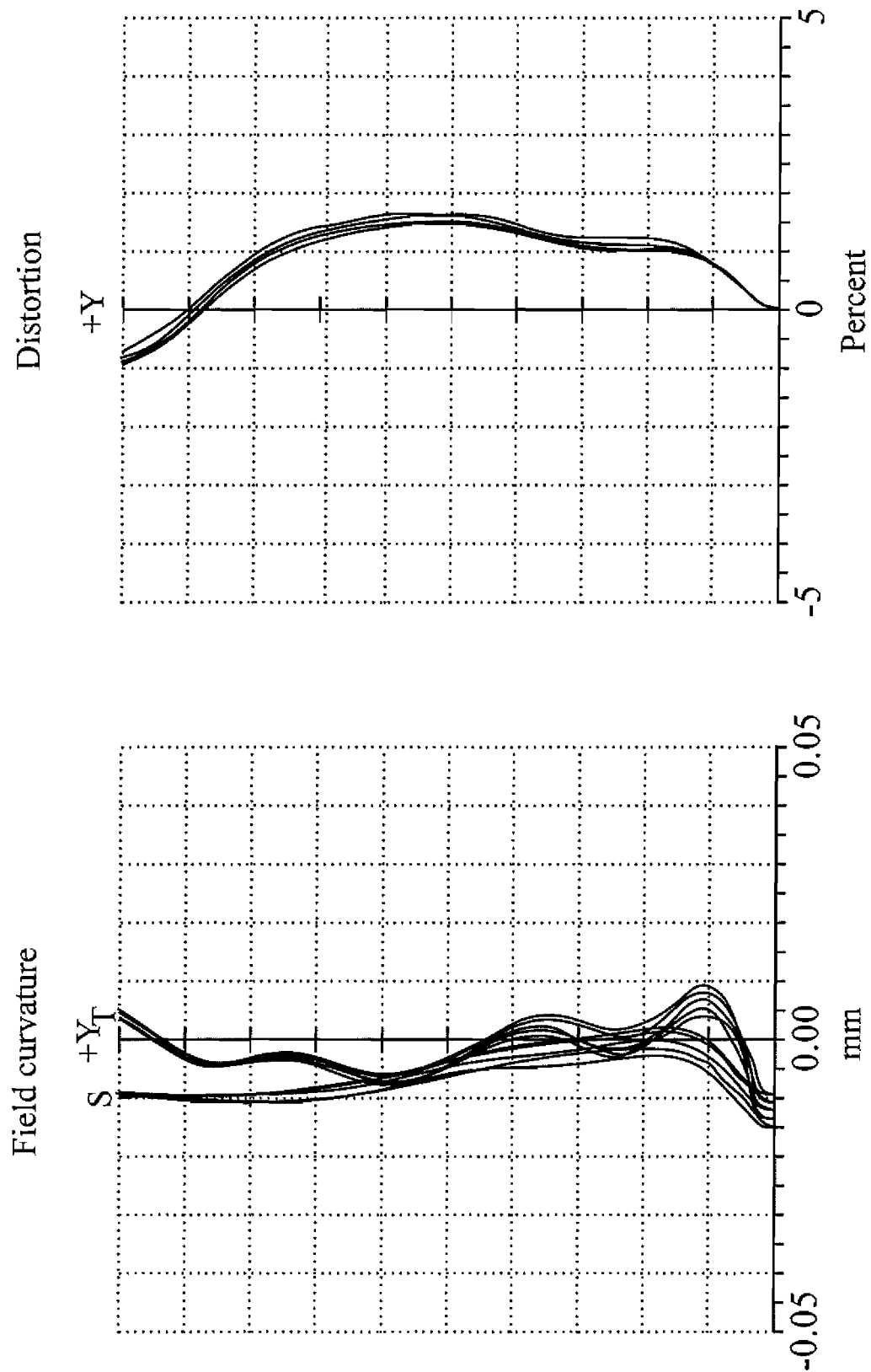
FIG. 3B is a diagram showing the optical performance including field curvature and distortion of the optical lens according to the third embodiment of the present invention in the condition that a first aperture stop is in an active state and a second aperture stop is in an inactive state.
Figure 3C:
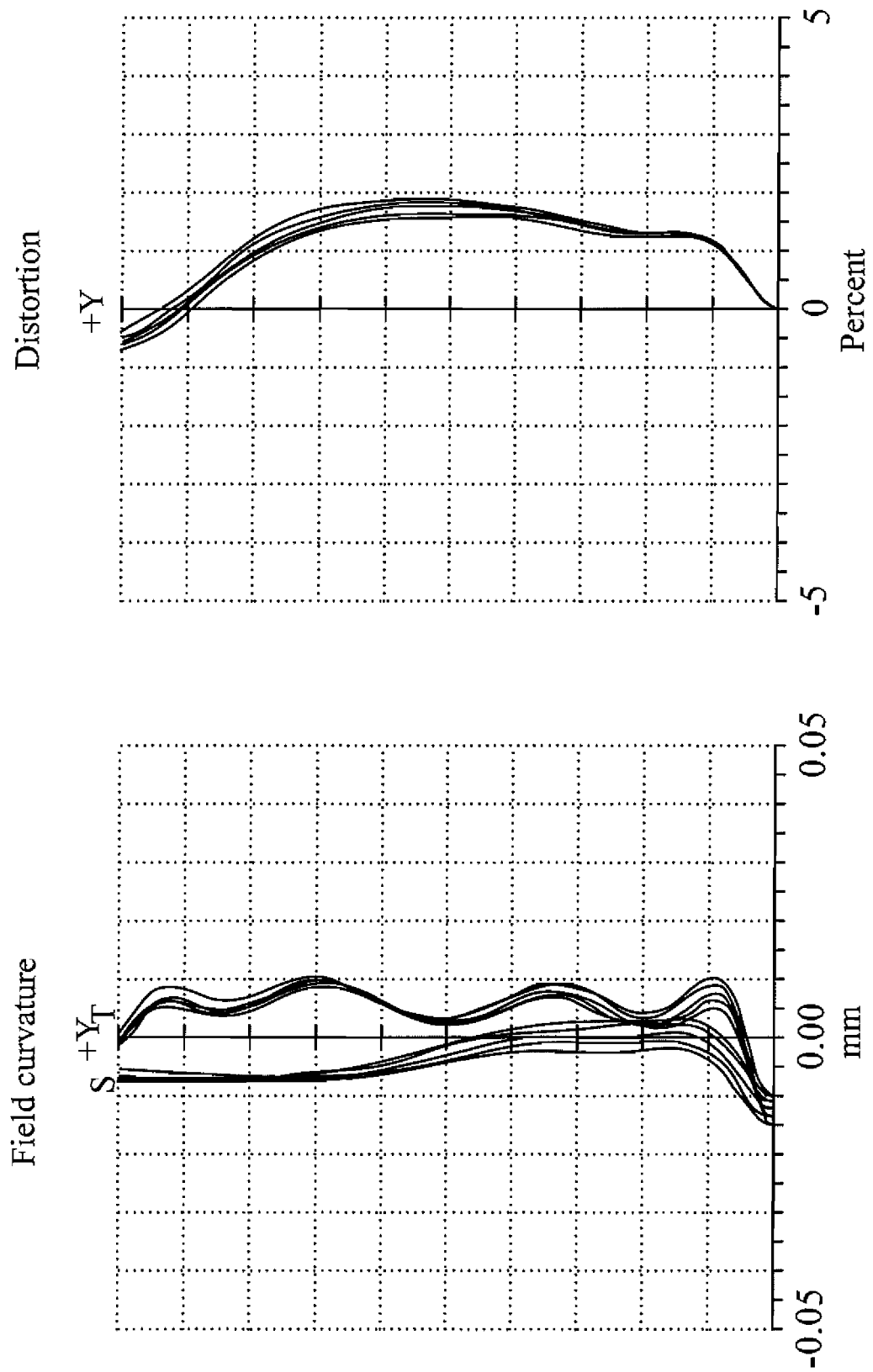
FIG. 3C is a diagram showing the optical performance including field curvature and distortion of the optical lens according to the third embodiment of the present invention in the condition that the first aperture stop is in the inactive state and the second aperture stop is in the active state.
Figure 3D:
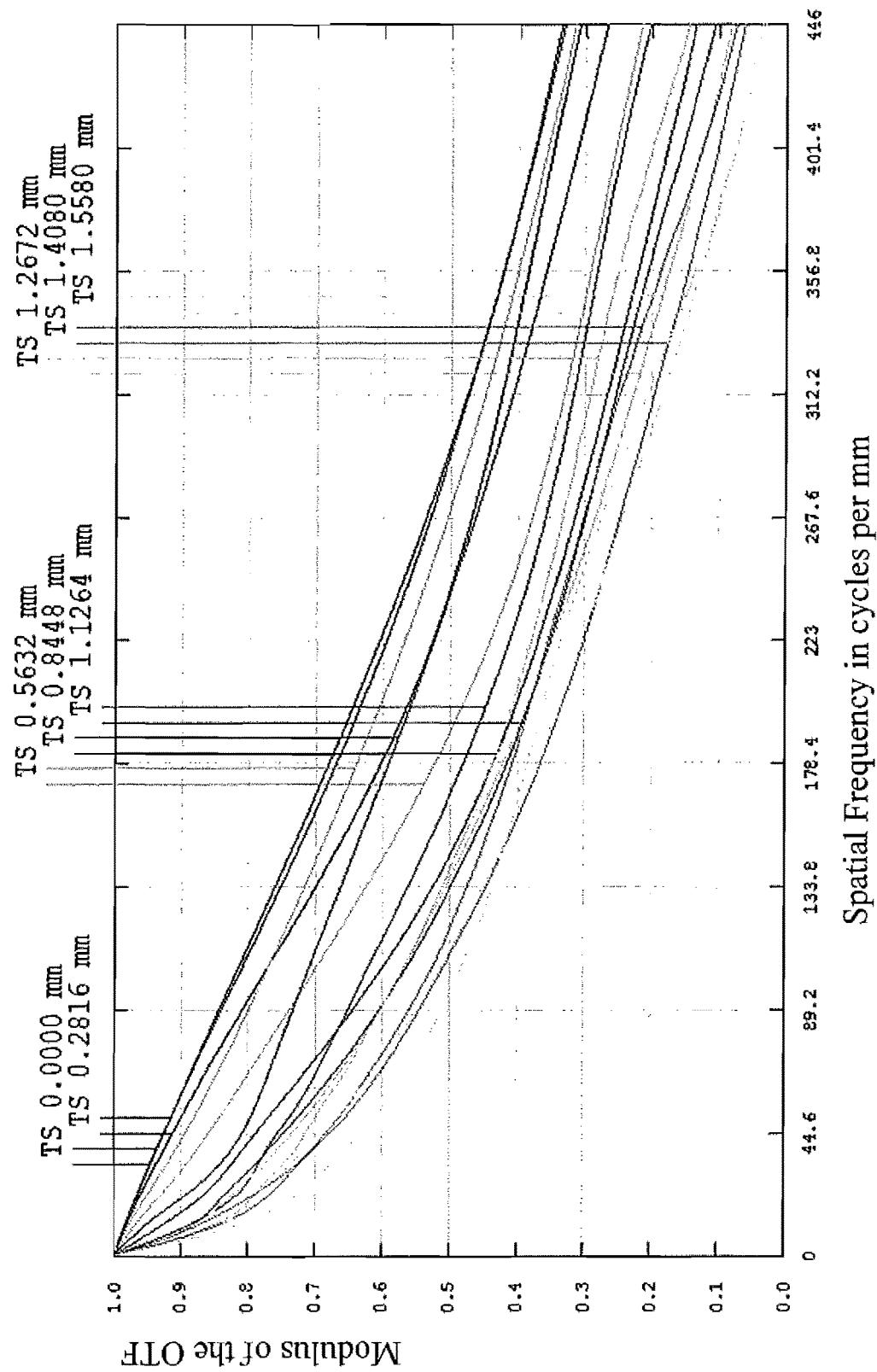
FIG. 3D is a diagram showing polychromatic diffraction modulation transfer function (MTF) of the optical lens according to the third embodiment of the present invention in the condition that the first aperture stop is in the active state and the second aperture stop is in the inactive state.
Figure 3E:
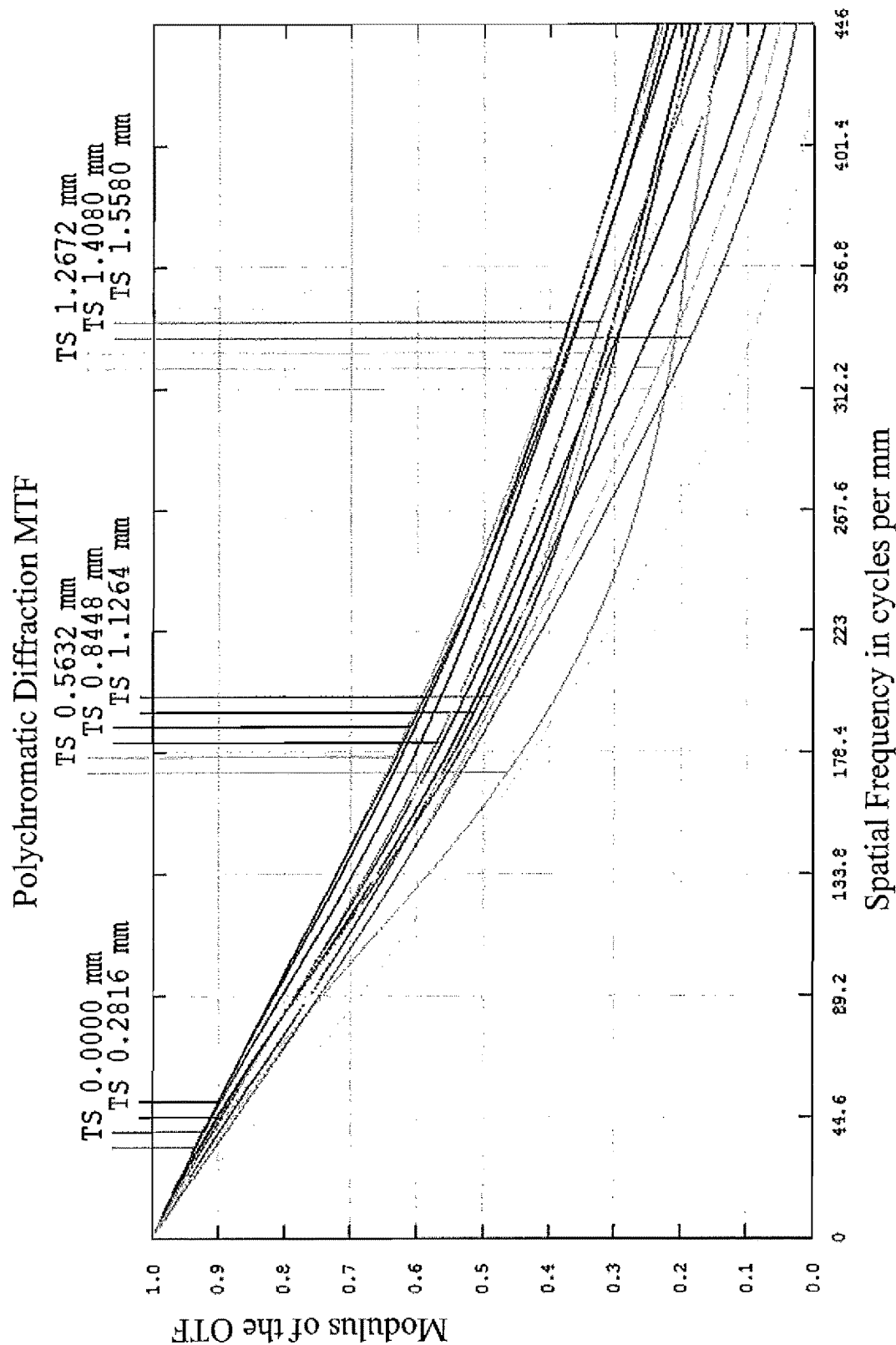
FIG. 3E is a diagram showing polychromatic diffraction modulation transfer function of the optical lens according to the third embodiment of the present invention in the condition that the first aperture stop is in the inactive state and the second aperture stop is in the active state.

FIG. 3B is a diagram showing the optical performance including field curvature and distortion of the optical lens according to the third embodiment of the present invention in the condition that the first aperture stop STO1 is in the active state and the second aperture stop STO2 is in the inactive state. FIG. 3C is a diagram showing the optical performance including field curvature and distortion of the optical lens according to the third embodiment of the present invention in the condition that the first aperture stop STO1 is in the inactive state and the second aperture stop STO2 is in the active state. FIG. 3D is a diagram showing polychromatic diffraction modulation transfer function (MTF) of the optical lens according to the third embodiment of the present invention in the condition that the first aperture stop STO1 is in the active state and the second aperture stop STO2 is in the inactive state. FIG. 3E is a diagram showing polychromatic diffraction modulation transfer function of the optical lens according to the third embodiment of the present invention in the condition that the first aperture stop STO1 is in the inactive state and the second aperture stop STO2 is in the active state.

Fourth Embodiment

FIG. 4A is a schematic diagram showing an optical structure in accordance with a fourth embodiment of an optical lens of the present invention. The optical lens according to the fourth embodiment of the present invention comprises four pieces of lenses, which are a first lens L1, a second lens L2, a third lens L3, and a fourth lens L4 arranged in order from the image side IMA to the object side OBJ. The optical lens utilizes one low-dispersion lens L2 cooperating with three high-dispersion lenses L1, L3, and L4. The framework of its refractive power is negative, negative, positive, and positive in order form the image side to the object side. Specifically, the first lens L1 is a lens having negative refractive power, and the image-side surface thereof is a concave face and has at least a point of inflection arranged thereon. The second lens L2 is a lens having negative refractive power and has a concave surface facing the object side and a convex surface facing the image side. The third lens L3 is approximate to a meniscus convex lens and has a concave surface facing the object side and a convex surface facing the image side. The fourth lens L4 is approximate to a meniscus convex lens.

The optical lens according to the fourth embodiment of the present invention also has at least two aperture stops, that is, a first aperture stop STO1 and a second aperture stop STO2. The first aperture stop STO1 is disposed between the third lens L3 and the fourth lens L4 and the second aperture stop STO2 is disposed at the outside of the lens at the most object side (that is, the fourth lens L4). The distance on the optical axis from the first aperture stop STO1 to the image plane IP is SL1, the distance on the optical axis from the second aperture stop STO2 to the image plane IP is SL2, and the distance on the optical axis from the object-side surface of the lens at the most object side (that is, the fourth lens L4) to the image plane IP is TTL. The optical lens according to the third embodiment of the present invention satisfies the following equation: $1.2<(SL1+SL2)/TTL<2.5$.

As shown in Table 7 below, related data of the respective lenses of the optical lens shown in FIG. 4A are shown in the condition that the first aperture stop STO1 is in an active state and the second aperture stop STO2 is in an inactive state. Table 7 shows that the focal length of the optical lens according to the fourth embodiment of the present invention is 2.3182, and the refractive power for the respective lenses sequentially is −14.3533, −4.61481, 2.07924, and 3.14393 in order from L1, L2, L3, and L4. In the condition that the first aperture stop STO1 is in the active state, the effective f-number of this optical system is 1.8, the viewing angle is 89 degrees, and the total length of the optical lens is 3.409 mm. Further, in the condition that the second aperture stop STO2 is in the active state, the effective f-number of this optical system is 2.8.

TABLE 7

| Focal length = 2.318 mm F-number = 1.8 Maximum half angle of view = 44.5 | | | | | |
|---|---|---|---|---|---|
| Surface Index | | Radius of Curvature R (mm) | Thickness/ Distance D (mm) | Refractive Index (Nd) | Abbe No. (Vd) | Conic Constant |
| R0 | Image Side | | | | | |
| R1 | IR | Plano | 0.105362 | 1.51633 | 64.14202 | 0 |
| R2 | | Plano | 0.21 | | | 0 |
| R3 | L1 | 0.898954 | 0.6844 | 1.5441 | 56.0936 | −2.90282 |
| R4 | | 1.195782 | 0.452062 | | | −0.44492 |
| R5 | L2 | −1.26429 | 0.202173 | 1.650958 | 21.51361 | 0.051651 |
| R6 | | −0.76452 | 0.455948 | | | −0.24406 |
| R7 | L3 | −1.19373 | 0.081371 | 1.755 | 51.2 | 0.037002 |
| R8 | | 4.0376 | 0.499949 | | | 5.994392 |
| R9 | STO1 | ∞ | 0.35304 | | | 0 |
| R10 | L4 | 8.735552 | 0.003026 | 1.755 | 51.2 | 0 |
| R11 | | 1.905175 | 0.362252 | | | 2.440844 |
| R12 | STO2 | ∞ | 0 | | | 0 |
| R13 | Object Side | | | | | |

Table 8 shows related data of aspheric lenses shown in Table 7.

TABLE 8

| | Coefficient on r^2 | Coefficient on r^4 | Coefficient on r^6 | Coefficient on r^8 | Coefficient on r^10 |
|---|---|---|---|---|---|
| IMA surface of L1 | 0 | −0.23128355 | 0.14175378 | −0.067994162 | 0.0213542 |
| | Coefficient on r^12 | Coefficient on r^14 | Coefficient on r^16 | Coefficient on r^18 | Coefficient on r^20 |
| | −0.004568351 | 0.000508655 | −1.12562E−05 | −1.12562E−05 | −1.12562E−05 |
| OBJ surface of L1 | Coefficient on r^2 | Coefficient on r^4 | Coefficient on r^6 | Coefficient on r^8 | Coefficient on r^10 |
| | 0 | −0.52650509 | 0.25194 | −0.17353961 | 0.14660685 |
| | Coefficient on r^12 | Coefficient on r^14 | Coefficient on r^16 | Coefficient on r^18 | Coefficient on r^20 |
| | −0.10183205 | 0.039677909 | −0.006161127 | −0.006161127 | −0.006161127 |
| IMA surface of L2 | Coefficient on r^2 | Coefficient on r^4 | Coefficient on r^6 | Coefficient on r^8 | Coefficient on r^10 |
| | 0 | 0.27010932 | 0.06650994 | −0.32301541 | 0.77365395 |
| | Coefficient on r^12 | Coefficient on r^14 | Coefficient on r^16 | Coefficient on r^18 | Coefficient on r^20 |
| | −0.94713717 | 0.59387626 | −0.14295684 | −0.14295684 | −0.14295684 |
| OBJ surface of L2 | Coefficient on r^2 | Coefficient on r^4 | Coefficient on r^6 | Coefficient on r^8 | Coefficient on r^10 |
| | 0 | 0.66898512 | −0.61306349 | 1.4858343 | −1.342644 |
| | Coefficient on r^12 | Coefficient on r^14 | Coefficient on r^16 | Coefficient on r^18 | Coefficient on r^20 |
| | 2.9844358 | −6.412385 | 4.6891119 | 4.6891119 | 4.6891119 |
| IMA surface of L3 | Coefficient on r^2 | Coefficient on r^4 | Coefficient on r^6 | Coefficient on r^8 | Coefficient on r^10 |
| | 0 | −0.14982592 | 0.078819059 | −0.63534856 | 2.5712369 |
| | Coefficient on r^12 | Coefficient on r^14 | Coefficient on r^16 | Coefficient on r^18 | Coefficient on r^20 |
| | −3.7370466 | 1.9102048 | −0.30854624 | −0.30854624 | −0.30854624 |
| OBJ surface of L3 | Coefficient on r^2 | Coefficient on r^4 | Coefficient on r^6 | Coefficient on r^8 | Coefficient on r^10 |
| | 0 | −0.28823379 | −0.22965413 | 0.14621395 | −1.3892127 |
| | Coefficient on r^12 | Coefficient on r^14 | Coefficient on r^16 | Coefficient on r^18 | Coefficient on r^20 |
| | −0.77150298 | 17.474959 | −20.688299 | −20.688299 | −20.688299 |
| IMA surface of L4 | Coefficient on r^2 | Coefficient on r^4 | Coefficient on r^6 | Coefficient on r^8 | Coefficient on r^10 |
| | 0 | −0.178712 | 0.39455994 | −2.7937285 | 1.5267098 |
| | Coefficient on r^12 | Coefficient on r^14 | Coefficient on r^16 | Coefficient on r^18 | Coefficient on r^20 |
| | 28.838141 | −82.831787 | 66.34717 | 66.34717 | 66.34717 |
| OBJ surface of L4 | Coefficient on r^2 | Coefficient on r^4 | Coefficient on r^6 | Coefficient on r^8 | Coefficient on r^10 |
| | 0 | −0.087825582 | −0.23623031 | 0.25832584 | −0.042191405 |
| | Coefficient on r^12 | Coefficient on r^14 | Coefficient on r^16 | Coefficient on r^18 | Coefficient on r^20 |
| | 4.1396749 | 10.902824 | −9.0782311 | −9.0782311 | −9.0782311 |

Figure 4B:
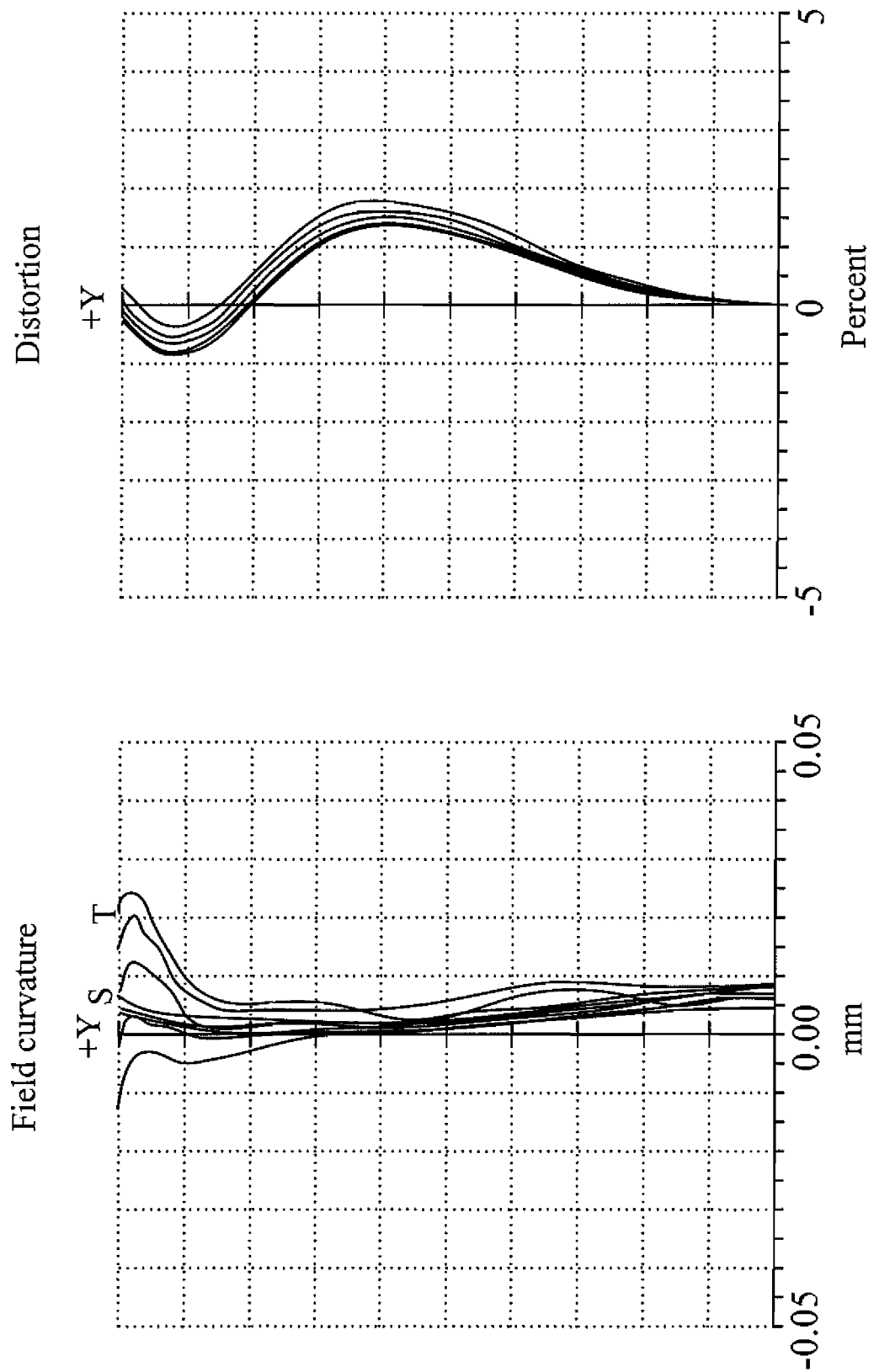
FIG. 4B is a diagram showing the optical performance including field curvature and distortion of the optical lens according to the fourth embodiment of the present invention in the condition that a first aperture stop is in an active state and a second aperture stop is in an inactive state.
Figure 4C:
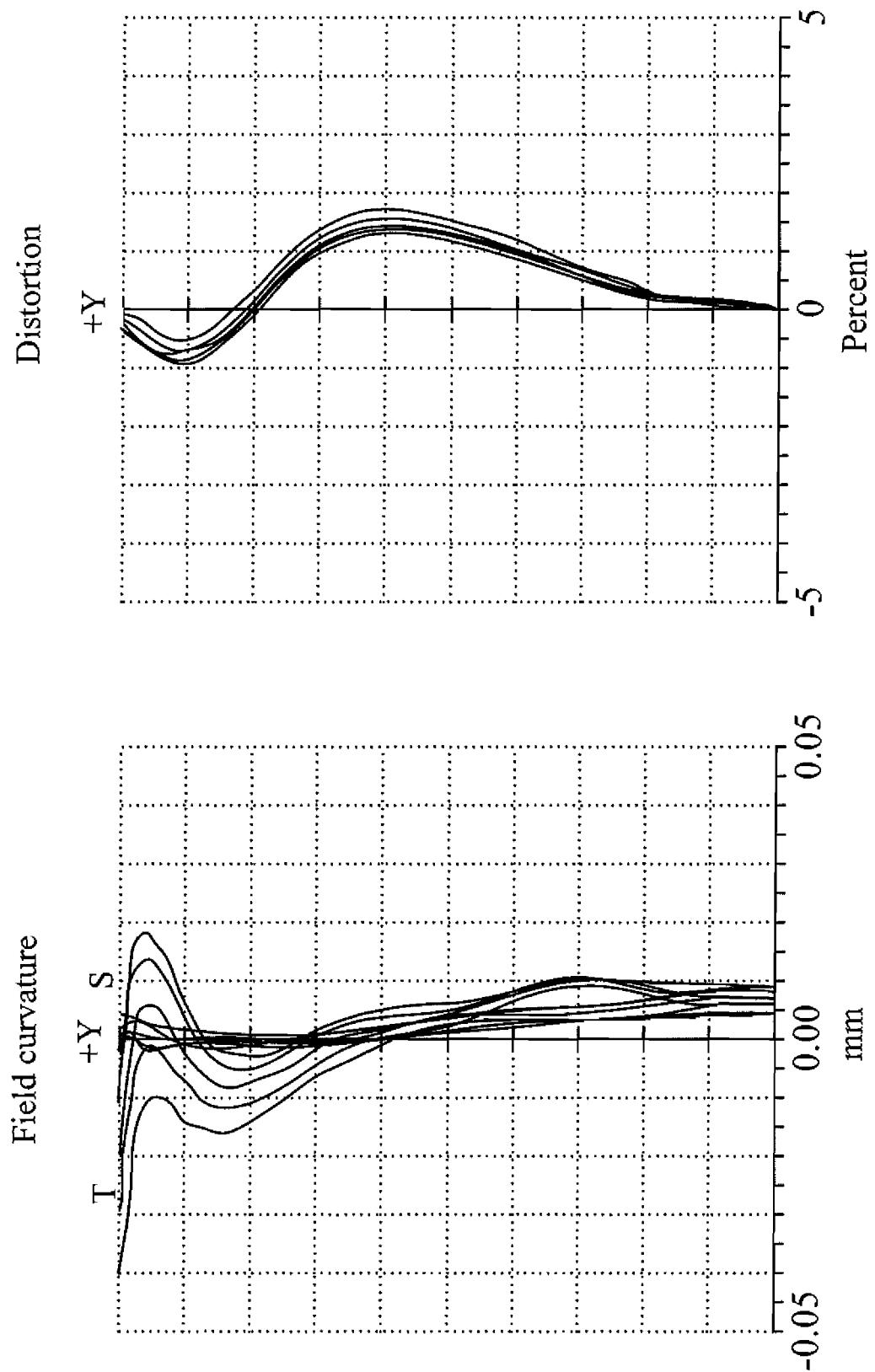
FIG. 4C is a diagram showing the optical performance including field curvature and distortion of the optical lens according to the fourth embodiment of the present invention in the condition that the first aperture stop is in the inactive state and the second aperture stop is in the active state.
Figure 4D:
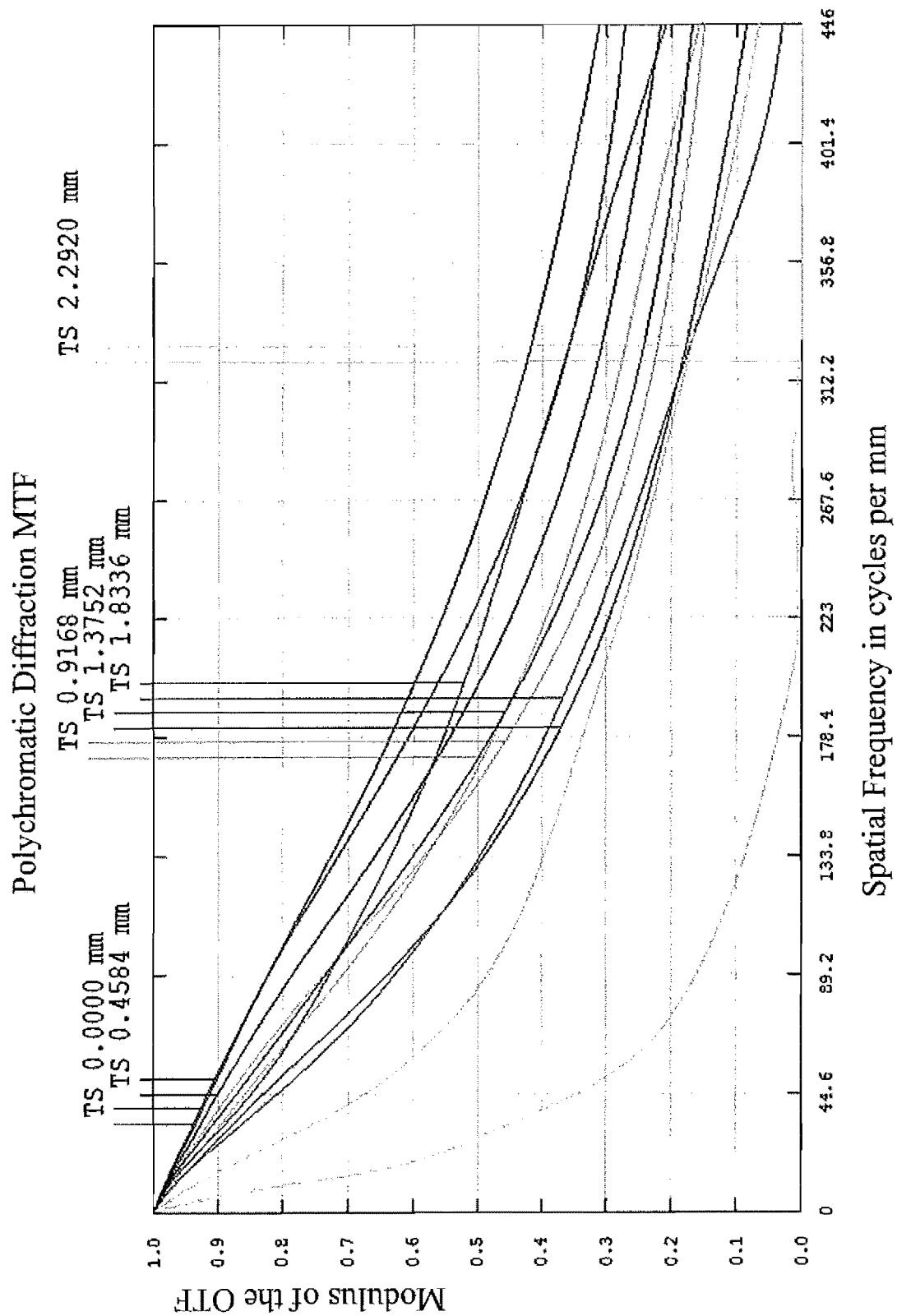
FIG. 4D is a diagram showing polychromatic diffraction modulation transfer function (MTF) of the optical lens according to the fourth embodiment of the present invention in the condition that the first aperture stop is in the active state and the second aperture stop is in the inactive state.
Figure 4E:
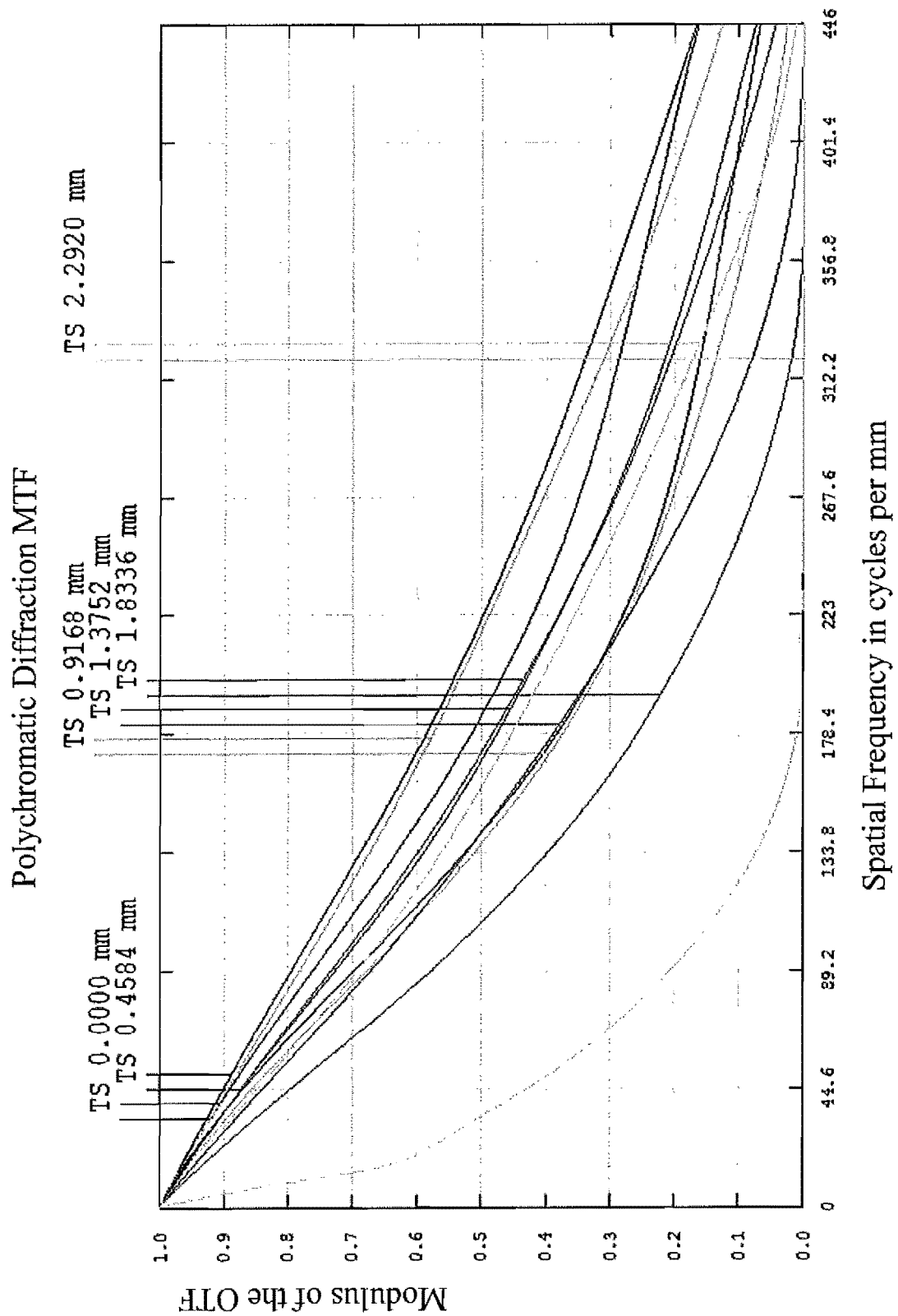
FIG. 4E is a diagram showing polychromatic diffraction modulation transfer function of the optical lens according to the fourth embodiment of the present invention in the condition that the first aperture stop is in the inactive state and the second aperture stop is in the active state.

FIG. 4B is a diagram showing the optical performance including field curvature and distortion of the optical lens according to the fourth embodiment of the present invention in the condition that the first aperture stop STO1 is in the active state and the second aperture stop STO2 is in the inactive state. FIG. 4C is a diagram showing the optical performance including field curvature and distortion of the optical lens according to the fourth embodiment of the present invention in the condition that the first aperture stop STO1 is in the inactive state and the second aperture stop STO2 is in the active state. FIG. 4D is a diagram showing polychromatic diffraction modulation transfer function (MTF) of the optical lens according to the fourth embodiment of the present invention in the condition that the first aperture stop STO1 is in the active state and the second aperture stop STO2 is in the inactive state. FIG. 4E is a diagram showing polychromatic diffraction modulation transfer function of the optical lens according to the fourth embodiment of the present invention in the condition that the first aperture stop STO1 is in the inactive state and the second aperture stop STO2 is in the active state.

Fifth Embodiment

FIG. 5A is a schematic diagram showing an optical structure in accordance with a fifth embodiment of an optical lens of the present invention. The optical lens according to the fifth embodiment of the present invention comprises five pieces of lenses, which are a first lens L1, a second lens L2, a third lens L3, a fifth lens L5, and a fourth lens L4 arranged in order from the image side IMA to the object side OBJ. The optical lens utilizes two low-dispersion lenses L2 and L3 cooperating with three high-dispersion lenses L1, L4, and L5. The framework of its refractive power is negative, positive, negative, positive, and positive in order form the image side to the object side. Specifically, the first lens L1 is a lens having negative refractive power, and the image-side surface thereof is a concave face and has at least a point of inflection arranged thereon. The second lens L2 is a lens having positive refractive power and has a concave surface facing the object side and a convex surface facing the image side. The third lens L3 is approximate to a meniscus concave lens. The fifth lens L5 is approximate to a meniscus convex lens. The fourth lens L4 is also approximate to a meniscus convex lens.

The optical lens according to the fifth embodiment of the present invention also has at least two aperture stops, that is, a first aperture stop STO1 and a second aperture stop STO2. The first aperture stop STO1 is disposed between the fourth lens L4 and the fifth lens L5 and the second aperture stop STO2 is disposed at the outside of the lens at the most object side (that is, the fourth lens L4). The distance on the optical axis from the first aperture stop STO1 to the image plane IP is SL1, the distance on the optical axis from the second aperture stop STO2 to the image plane IP is SL2, and the distance on the optical axis from the object-side surface of the lens at the most object side (that is, the fourth lens L4) to the image plane IP is TTL. The optical lens according to the first embodiment of the present invention satisfies the following equation: $1.2<(SL1+SL2)/TTL<2.5$.

As shown in Table 9 below, related data of the respective lenses of the optical lens shown in FIG. 5A are shown in the condition that the first aperture stop STO1 is in an active state and the second aperture stop STO2 is in an inactive state. Table 9 shows that the focal length of the optical lens according to the fifth embodiment of the present invention is 4.156, and the refractive power for the respective lenses sequentially is −7.5603, 17.4728, −4.8351, 4.09945, and 4.87028 in order from L1, L2, L3, L5, and L4. In the condition that the first aperture stop STO1 is in the active state, the effective f-number of this optical system is 1.6, the viewing angle is 79 degrees, and the total length of the optical lens is 5.19 mm. Further, in the condition that the second aperture stop STO2 is in the active state, the effective f-number of this optical system is 2.6.

TABLE 9

| Focal length = 4.15 mm F-number = 1.6 Maximum half angle of view = 39.5 ||||||
| --- | --- | --- | --- | --- | --- |
| Surface Index | | Radius of Curvature R (mm) | Thickness/ Distance D (mm) | Refractive Index (Nd) | Abbe No. (Vd) | Conic Constant |
| R0 | Image Side | | | | | |
| R1 | IR | Plano | 0.11413 | 1.5168 | 64.16734 | 0 |
| R2 | | Plano | 0.145 | | | 0 |
| R3 | L1 | ∞ | 0.8 | 1.535037 | 55.71072 | −5.44208 |
| R4 | | 3.015938 | 0.745032 | | | −17.1337 |
| R5 | L2 | −6.7872 | 0.313655 | 1.651 | 21.5 | 12.06767 |
| R6 | | −16.0254 | 0.554647 | | | −2555.19 |
| R7 | L3 | −100.075 | 0.591153 | 1.651 | 21.5 | −11896 |
| R8 | | −3.08129 | 0.232166 | | | 0 |
| R9 | L5 | −2.76701 | 0.038179 | 1.79679 | 45.35 | 0 |
| R10 | | −15.7774 | 0.641223 | | | 0 |
| R11 | STO1 | ∞ | 0.345203 | | | 0 |
| R12 | L4 | 4.659665 | 0.078218 | 1.59 | 61.18 | 0 |
| R13 | | 1.870937 | 0.598805 | | | −0.69405 |
| R14 | STO2 | ∞ | 0 | | | 0 |
| R15 | Object Side | | | | | |

Table 10 shows related data of aspheric lenses shown in Table 9.

TABLE 10

| | Coefficient on r^ 2 | Coefficient on r^ 4 | Coefficient on r^ 6 | Coefficient on r^ 8 | Coefficient on r^ 10 |
| --- | --- | --- | --- | --- | --- |
| IMA surface of L1 | 0 | −0.071190542 | 0.024244691 | −0.00591398 | 0.000790785 |
| | Coefficient on r^ 12 | Coefficient on r^ 14 | Coefficient on r^ 16 | Coefficient on r^ 18 | Coefficient on r^ 20 |
| | 4.92E−05 | 3.19E−08 | 9.62427E−08 | 9.62427E−08 | 9.62427E−08 |
| OBJ surface of L1 | Coefficient on r^ 2 | Coefficient on r^ 4 | Coefficient on r^ 6 | Coefficient on r^ 8 | Coefficient on r^ 10 |
| | 0 | −0.16500606 | 0.062901685 | −0.014461672 | −0.000675361 |
| | Coefficient on r^ 12 | Coefficient on r^ 14 | Coefficient on r^ 16 | Coefficient on r^ 18 | Coefficient on r^ 20 |
| | 0.000665084 | −5.40E−06 | −9.74299E−06 | −9.74299E−06 | −9.74299E−06 |
| IMA surface of L2 | Coefficient on r^ 2 | Coefficient on r^ 4 | Coefficient on r^ 6 | Coefficient on r^ 8 | Coefficient on r^ 10 |
| | 0 | −0.03644324 | 0.056433494 | −0.048174107 | 0.01705914 |
| | Coefficient on r^ 12 | Coefficient on r^ 14 | Coefficient on r^ 16 | Coefficient on r^ 18 | Coefficient on r^ 20 |
| | −0.002686547 | −6.06425E−05 | 6.32451E−05 | 6.32451E−05 | 6.32451E−05 |
| OBJ surface of L2 | Coefficient on r^ 2 | Coefficient on r^ 4 | Coefficient on r^ 6 | Coefficient on r^ 8 | Coefficient on r^ 10 |
| | 0 | −0.035879366 | 0.049041986 | −0.087187532 | 0.05414856 |
| | Coefficient on r^ 12 | Coefficient on r^ 14 | Coefficient on r^ 16 | Coefficient on r^ 18 | Coefficient on r^ 20 |
| | −0.016025378 | 0.000179043 | 0.000657297 | 0.000657297 | 0.000657297 |
| IMA surface of L3 | Coefficient on r^ 2 | Coefficient on r^ 4 | Coefficient on r^ 6 | Coefficient on r^ 8 | Coefficient on r^ 10 |
| | 0 | −0.061833968 | 0.014413759 | 0.036786997 | −0.029378927 |
| | Coefficient on r^ 12 | Coefficient on r^ 14 | Coefficient on r^ 16 | Coefficient on r^ 18 | Coefficient on r^ 20 |
| | 0.008084592 | 0.001797025 | 0.000727565 | −0.000727565 | −0.000727565 |
| OBJ surface of L3 | Coefficient on r^ 2 | Coefficient on r^ 4 | Coefficient on r^ 6 | Coefficient on r^ 8 | Coefficient on r^ 10 |
| | 0 | −0.07261039 | −0.018200106 | 0.075646828 | −0.013022632 |
| | Coefficient on r^ 12 | Coefficient on r^ 14 | Coefficient on r^ 16 | Coefficient on r^ 18 | Coefficient on r^ 20 |
| | −0.024606296 | 0.007762861 | −0.000321085 | −0.000321085 | −0.000321085 |
| IMA surface of L4 | Coefficient on r^ 2 | Coefficient on r^ 4 | Coefficient on r^ 6 | Coefficient on r^ 8 | Coefficient on r^ 10 |
| | 0 | −0.015873347 | 0.023847742 | −0.053177251 | 0.022204617 |
| | Coefficient on r^ 12 | Coefficient on r^ 14 | Coefficient on r^ 16 | Coefficient on r^ 18 | Coefficient on r^ 20 |
| | 0.007014824 | −0.015851821 | 0.005477248 | 0.005477248 | 0.005477248 |
| OBJ surface of L4 | Coefficient on r^ 2 | Coefficient on r^ 4 | Coefficient on r^ 6 | Coefficient on r^ 8 | Coefficient on r^ 10 |
| | 0 | 0.006465554 | 0.01071186 | −0.00123002 | −0.022193926 |
| | Coefficient on r^ 12 | Coefficient on r^ 14 | Coefficient on r^ 16 | Coefficient on r^ 18 | Coefficient on r^ 20 |
| | 0.025220379 | −0.011482542 | 0.000917697 | 0.000917697 | 0.000917697 |
| IMA surface of L5 | Coefficient on r^ 2 | Coefficient on r^ 4 | Coefficient on r^ 6 | Coefficient on r^ 8 | Coefficient on r^ 10 |
| | 0 | −0.017238977 | −0.037305922 | 0.010955635 | 0.046272346 |
| | Coefficient on r^ 12 | Coefficient on r^ 14 | Coefficient on r^ 16 | Coefficient on r^ 18 | Coefficient on r^ 20 |
| | −0.044312667 | 0.006289162 | 0.002419004 | 0.002419004 | 0.002419004 |
| OBJ surface of L5 | Coefficient on r^ 2 | Coefficient on r^ 4 | Coefficient on r^ 6 | Coefficient on r^ 8 | Coefficient on r^ 10 |
| | 0 | −0.019858833 | −0.025689834 | 0.000320202 | 0.014439705 |
| | Coefficient on r^ 12 | Coefficient on r^ 14 | Coefficient on r^ 16 | Coefficient on r^ 18 | Coefficient on r^ 20 |
| | −0.025103433 | 0.009597725 | 0.000453701 | 0.000453701 | 0.000453701 |

Figure 5B:
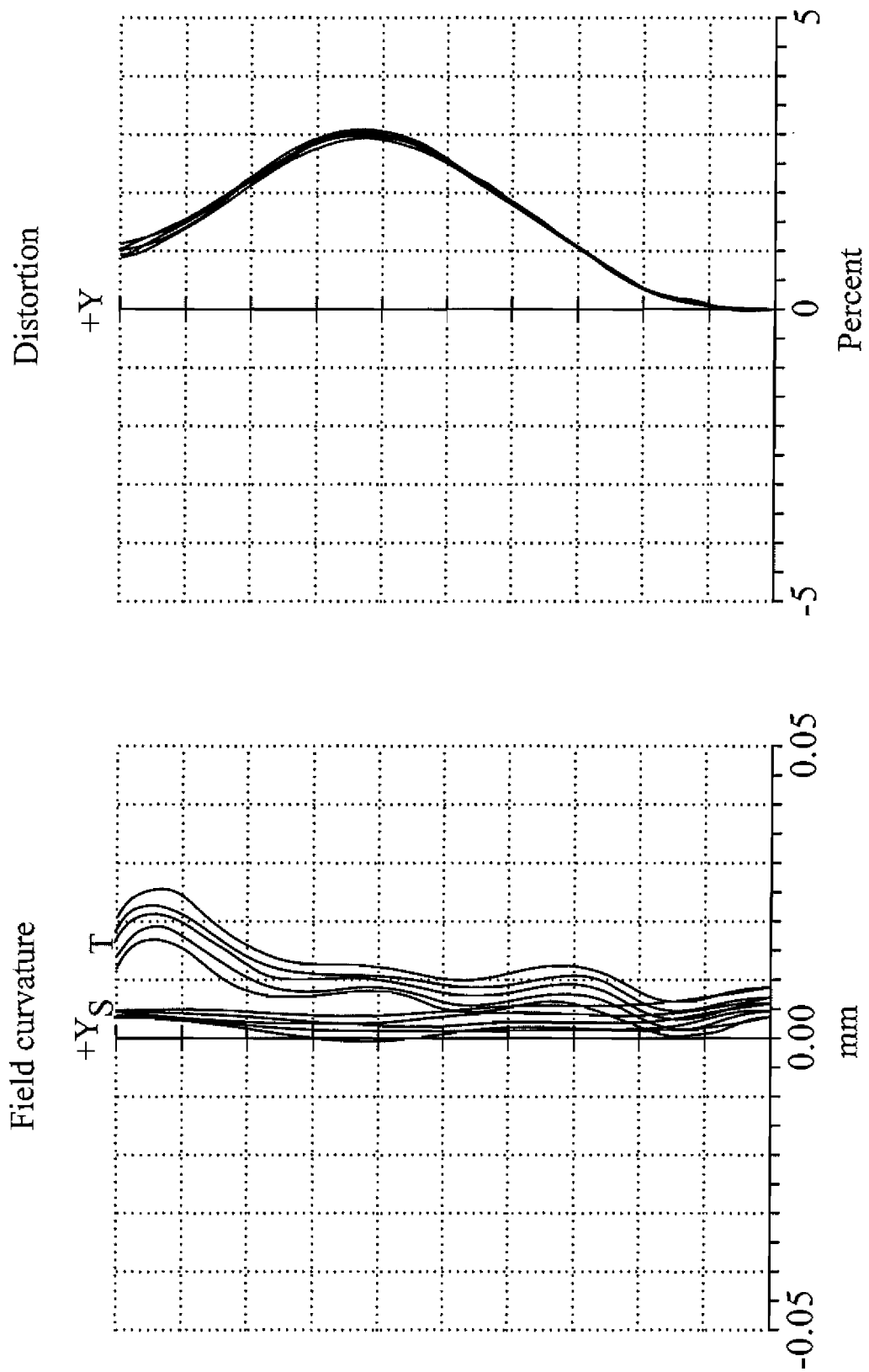
FIG. 5B is a diagram showing the optical performance including field curvature and distortion of the optical lens according to the fifth embodiment of the present invention in the condition that a first aperture stop is in an active state and a second aperture stop is in an inactive state.
Figure 5C:
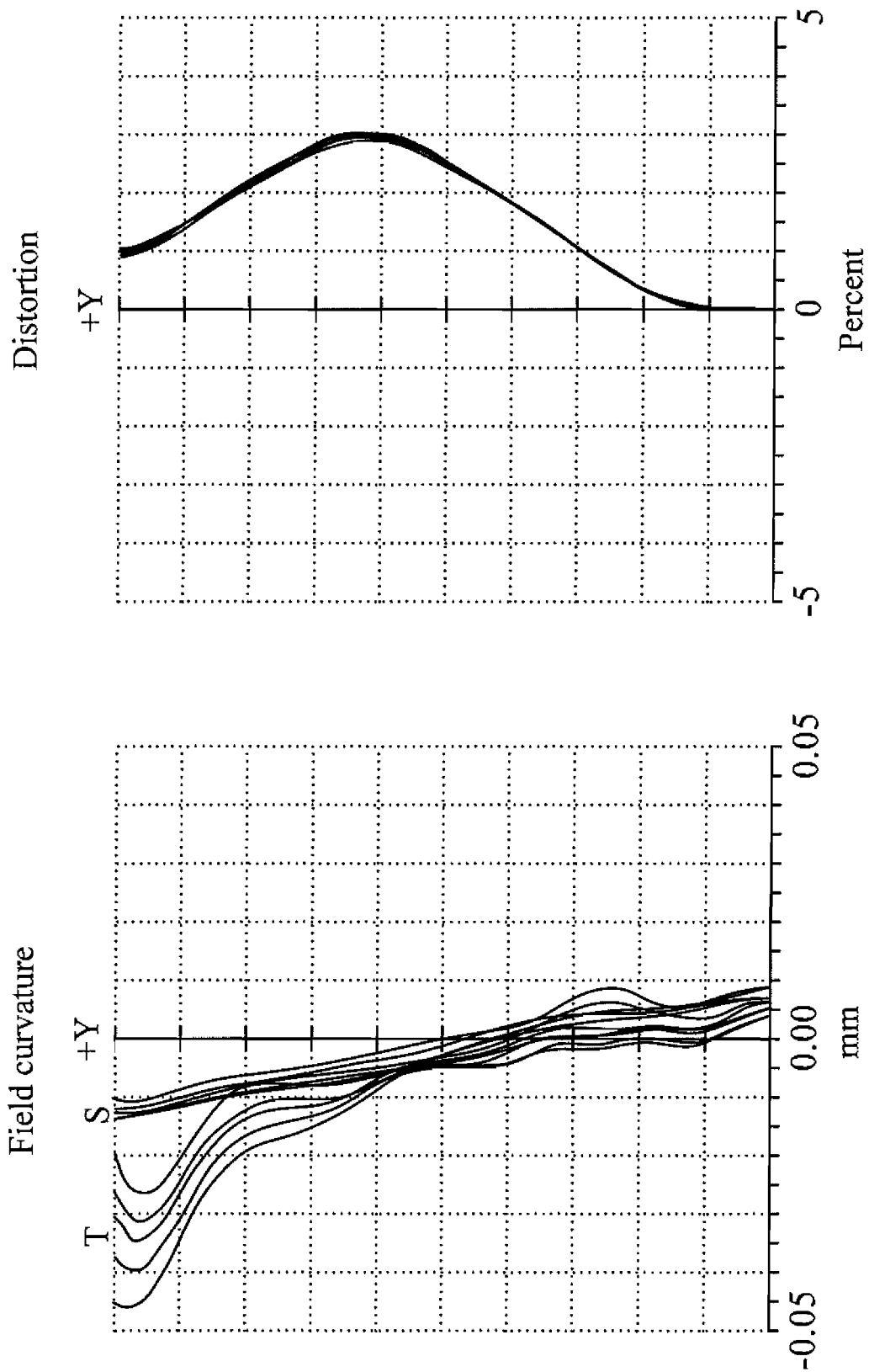
FIG. 5C is a diagram showing the optical performance including field curvature and distortion of the optical lens according to the fifth embodiment of the present invention in the condition that the first aperture stop is in the inactive state and the second aperture stop is in the active state.
Figure 5D:
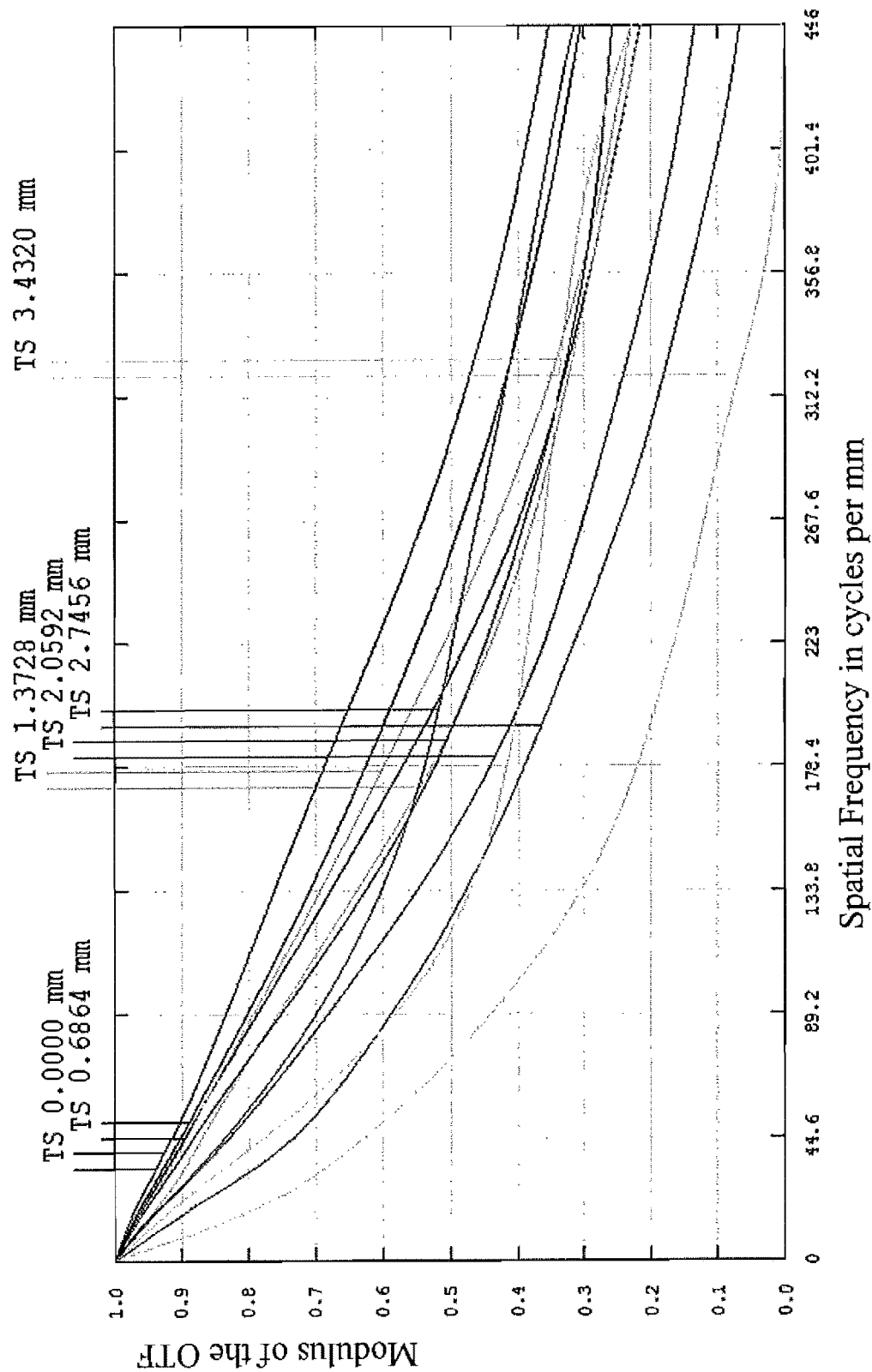
FIG. 5D is a diagram showing polychromatic diffraction modulation transfer function (MTF) of the optical lens according to the fifth embodiment of the present invention in the condition that the first aperture stop is in the active state and the second aperture stop is in the inactive state.
Figure 5E:
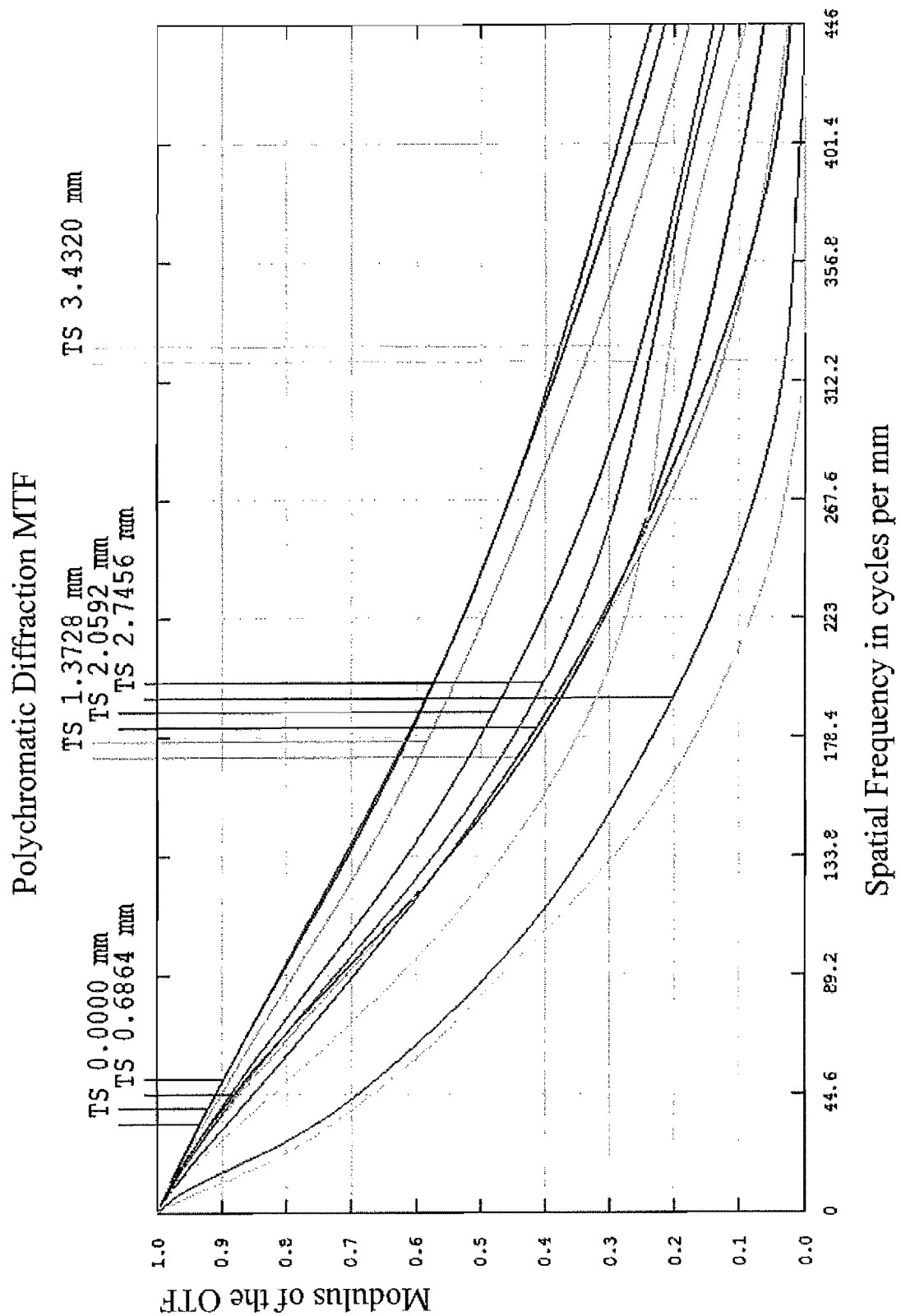
FIG. 5E is a diagram showing polychromatic diffraction modulation transfer function of the optical lens according to the fifth embodiment of the present invention in the condition that the first aperture stop is in the inactive state and the second aperture stop is in the active state.

FIG. 5B is a diagram showing the optical performance including field curvature and distortion of the optical lens according to the fifth embodiment of the present invention in the condition that the first aperture stop STO1 is in the active state and the second aperture stop STO2 is in the inactive state. FIG. 5C is a diagram showing the optical performance including field curvature and distortion of the optical lens according to the fifth embodiment of the present invention in the condition that the first aperture stop STO1 is in the inactive state and the second aperture stop STO2 is in the active state. FIG. 5D is a diagram showing polychromatic diffraction modulation transfer function (MTF) of the optical lens according to the fifth embodiment of the present invention in the condition that the first aperture stop STO1 is in the active state and the second aperture stop STO2 is in the inactive state. FIG. 5E is a diagram showing polychromatic diffraction modulation transfer function of the optical lens according to the fifth embodiment of the present invention in the condition that the first aperture stop STO1 is in the inactive state and the second aperture stop STO2 is in the active state.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An optical lens, which makes object light rays transmit from an object side to an image side on an optical axis and form an image on an image plane, said optical lens comprising:
   a lens group establishing the optical axis, comprising a first lens and a second lens arranged in order from the image side to the object side; and
   a first aperture stop and a second aperture stop separately located on the optical axis,
   wherein the first lens has an image-side surface which is a concave face and has a point of inflection arranged thereon;
   wherein the second lens comprises a concave surface facing the object side and a convex surface facing the image side; and
   wherein the optical lens satisfies the following equation:

$$1.2<(SL1+SL2)/TTL<2.5,$$

where SL1 is a distance on the optical axis from the first aperture stop to the image plane; SL2 is a distance on the optical axis from the second aperture stop to the image plane; and TTL is a distance on the optical axis from an object-side surface of a lens of the lens group at the most object side to the image plane.

2. The optical lens according to claim 1, wherein the first lens has negative refractive power.

3. The optical lens according to claim 2, wherein the lens group comprises the first lens, the second lens, a third lens, and a fourth lens arranged in order from the image side to the object side, and the fourth lens has positive refractive power.

4. The optical lens according to claim 3, wherein the lens group further comprises a fifth lens disposed between the third lens and the fourth lens, and the second lens has positive refractive power and at least one of the third lens and the fifth lens has positive refractive power.

5. The optical lens according to claim 4, wherein the fourth lens and the fifth lens are meniscus convex lenses, the third lens is a plano-concave lens.

6. The optical lens according to claim 5, wherein the second aperture stop is disposed between the object side and a lens of the lens group at the most object side and the first aperture stop is disposed between the image side and the lens of the lens group at the most object side.

7. An optical lens, which makes object light rays transmit from an object side to an image side on an optical axis and form an image on an image plane, said optical lens comprising:
   a lens group establishing the optical axis, comprising a first lens and a second lens arranged in order from the image side to the object side; and
   a first aperture stop and a second aperture stop separately located on the optical axis,
   wherein the first lens has an image-side surface which is a concave face and has a point of inflection arranged thereon;
   wherein the second lens comprises a concave surface facing the object side and a convex surface facing the image side; and
   wherein the optical lens further comprises:
   an optical system frame configured to mount the lens group thereon;
   a base plate fastened on the optical system frame or formed by extending from the optical system frame;
   a cover plate spaced apart from the base plate and fastened to the base plate;
   one or more aperture adjusting blades included in the second aperture, the aperture of the second aperture stop being altered by adjusting the aperture adjusting blade, the aperture adjusting blade being disposed between the cover plate and the base plate; and
   a transparent plate attached to the optical system frame;
   wherein the lens group, the base plate, the aperture adjusting blade, the cover plate, and the transparent plate are arranged in order from the image side to the object side.

8. The optical lens according to claim 2, further comprising:
   an optical system frame configured to mount the lens group thereon;
   a base plate fastened on the optical system frame or formed by extending from the optical system frame;
   a cover plate spaced apart from the base plate and fastened to the base plate;
   one or more aperture adjusting blades included in the second aperture, the aperture of the second aperture stop being altered by adjusting the aperture adjusting blade, the aperture adjusting blade being disposed between the cover plate and the base plate; and
   a transparent plate attached to the optical system frame;
   wherein the lens group, the base plate, the aperture adjusting blade, the cover plate, and the transparent plate are arranged in order from the image side to the object side.

9. The optical lens according to claim 3, further comprising:
   an optical system frame configured to mount the lens group thereon;
   a base plate fastened on the optical system frame or formed by extending from the optical system frame;
   a cover plate spaced apart from the base plate and fastened to the base plate;
   one or more aperture adjusting blades included in the second aperture, the aperture of the second aperture stop being altered by adjusting the aperture adjusting blade, the aperture adjusting blade being disposed between the cover plate and the base plate; and
   a transparent plate attached to the optical system frame;
   wherein the lens group, the base plate, the aperture adjusting blade, the cover plate, and the transparent plate are arranged in order from the image side to the object side.

10. The optical lens according to claim 4, further comprising:
    an optical system frame configured to mount the lens group thereon;
    a base plate fastened on the optical system frame or formed by extending from the optical system frame;

a cover plate spaced apart from the base plate and fastened to the base plate;

one or more aperture adjusting blades included in the second aperture, the aperture of the second aperture stop being altered by adjusting the aperture adjusting blade, the aperture adjusting blade being disposed between the cover plate and the base plate; and a transparent plate attached to the optical system frame;

wherein the lens group, the base plate, the aperture adjusting blade, the cover plate, and the transparent plate are arranged in order from the image side to the object side.

11. The optical lens according to claim 5, further comprising:

an optical system frame configured to mount the lens group thereon;

a base plate fastened on the optical system frame or formed by extending from the optical system frame;

a cover plate spaced apart from the base plate and fastened to the base plate;

one or more aperture adjusting blades included in the second aperture, the aperture of the second aperture stop being altered by adjusting the aperture adjusting blade, the aperture adjusting blade being disposed between the cover plate and the base plate; and a transparent plate attached to the optical system frame;

wherein the lens group, the base plate, the aperture adjusting blade, the cover plate, and the transparent plate are arranged in order from the image side to the object side.

12. The optical lens according to claim 7, wherein the second aperture stop is an aperture stop with adjustable aperture, and the aperture of the first aperture stop is greater than that of the second aperture stop when the aperture of the second aperture stop is adjusted to be in an active state.

13. An optical lens, which makes object light rays transmit from an object side to an image side on an optical axis and form an image on an image plane, said optical lens comprising:

a lens group establishing the optical axis;

a first aperture stop disposed within the lens group; and a second aperture stop disposed at the object side outside the lens group, wherein the second aperture stop is an aperture stop with adjustable aperture, and the aperture of the first aperture stop is greater than that of the second aperture stop when the aperture of the second aperture stop is adjusted to be in an active state, wherein the optical lens satisfies the following equation:

$$1.2<(SL1+SL2)/TTL<2.5,$$

where SL1 is a distance on the optical axis from the first aperture stop to the image plane; SL2 is a distance on the optical axis from the second aperture stop to the image plane; and TTL is a distance on the optical axis from an object-side surface of a lens of the lens group at the most object side to the image plane.

14. The optical lens according to claim 13, wherein the lens group comprises a first lens, a second lens, a third lens, and a fourth lens arranged in order from the image side to the object side, and the refractive power of the first lens to the fourth lens sequentially are negative, positive, negative, and positive, or negative, negative, positive, and positive, or negative, positive, positive, and positive.

15. The optical lens according to claim 14, wherein the lens group further comprises a fifth lens disposed between the third lens and the fourth lens, and the refractive power of the lenses of the lens group sequentially are negative, positive, negative, positive, and positive, or negative, positive, positive, negative, and positive in order from the image side to the object side, and wherein the first aperture stop is disposed between the third lens and fourth lens or between the fourth lens and the fifth lens.

16. The optical lens according to claim 13, further comprising:

an optical system frame configured to mount the lens group thereon;

a base plate having a first opening, the base plate being fastened on the optical system frame or formed by extending from the optical system frame;

a cover plate having a second opening, the cover plate being spaced apart from the base plate and fastened to the base plate through a screw; and one or more aperture adjusting blades included in the second aperture, the aperture of the second aperture stop being altered by adjusting the aperture adjusting blade, the aperture adjusting blade being disposed between the cover plate and the base plate;

wherein the lens group, the cover plate, the aperture adjusting blade, and the base plate are arranged in order from the image side to the object side.

17. The optical lens according to claim 13, wherein the fourth lens and the fifth lens are meniscus convex lenses, the third lens is a plano-concave lens, and the second lens comprises an object-side concave surface and an image-side convex surface.

* * * * *